US012596915B2

(12) United States Patent
Carrara et al.

(10) Patent No.: US 12,596,915 B2
(45) Date of Patent: *Apr. 7, 2026

(54) GENERATIVE AI FOR INDUSTRIAL AUTOMATION CONTROL DESIGN ENVIRONMENT

(71) Applicant: Rockwell Automation Technologies, Inc., Mayfield Heights, OH (US)

(72) Inventors: Anthony Carrara, Strongsville, OH (US); Rahul P. Patel, Aurora, OH (US); Michael J. Ohlsen, Chesterland, OH (US); Ashish Anand, Aurora, OH (US); Matthew T. Masarik, Cleveland, OH (US); Adam J. Gregory, Oak Creek, WI (US); Kurt E. Mathson, Menomonee Falls, WI (US); Justin Wengatz, North Ridgeville, OH (US); Daniel T. Richter, Hudson, OH (US); Omar A. Bahader, Solon, OH (US); Lorenzo Majewski, Waukesha, WI (US); Elie Nader, Montreal (CA); Fabiano Fernandes, Solon, OH (US); Srdjan Josipovic, Pompano Beach, FL (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 416 days.

This patent is subject to a terminal disclaimer.

(21) Appl. No.: 18/459,822

(22) Filed: Sep. 1, 2023

(65) Prior Publication Data

US 2025/0077847 A1 Mar. 6, 2025

(51) Int. Cl.
*G06N 3/04* (2023.01)
*G05B 19/40* (2006.01)
(Continued)

(52) U.S. Cl.
CPC ......... *G06N 3/0475* (2023.01); *G05B 19/409* (2013.01); *G05B 2219/36133* (2013.01)

(58) Field of Classification Search
CPC ............... G06N 3/0475; G05B 19/409; G05B 2219/36133
See application file for complete search history.

(56) References Cited

U.S. PATENT DOCUMENTS

| | | | |
|---|---|---|---|
| 7,324,856 B1 * | 1/2008 | Bromley | .............. G05B 19/056 703/22 |
| 7,334,216 B2 * | 2/2008 | Molina-Moreno | ....... G06F 8/35 717/109 |

(Continued)

OTHER PUBLICATIONS

Regenwetter et al., "Deep Generative Models in Engineering Design: A Review", Jul. 2022, Journal of Mechanical Design. (Year: 2022).*

(Continued)

*Primary Examiner* — Mohammad Ali
*Assistant Examiner* — Kelvin Booker
(74) *Attorney, Agent, or Firm* — Amin, Turocy & Watson, LLP

(57) ABSTRACT

An integrated development environment (IDE) for designing, programming, and configuring aspects of an industrial automation system uses a generative artificial intelligence (AI) model and associated neural networks to generate portions of an industrial automation project in accordance with functional requirements provided to the industrial IDE system in intuitive formats, such as spoken or written plain language text. The system uses generative AI to translate plain language requests or functional specifications into industrial control code, human-machine interface (HMI) applications, device configuration settings, or other aspects of an industrial control project.

20 Claims, 24 Drawing Sheets

(51) Int. Cl.
    *G05B 19/409*     (2006.01)
    *G06N 3/0475*     (2023.01)

(56)         References Cited

U.S. PATENT DOCUMENTS

| | | | | |
|---|---|---|---|---|
| 7,835,805 | B2 * | 11/2010 | Hood | G05B 19/409 |
| | | | | 700/20 |
| 7,912,560 | B2 * | 3/2011 | Hood | G05B 19/042 |
| | | | | 700/20 |
| 8,191,005 | B2 * | 5/2012 | Baier | G05B 19/409 |
| | | | | 715/825 |
| 10,204,311 | B2 | 2/2019 | Standing et al. | |
| 10,942,710 | B1 * | 3/2021 | Dunn | G06F 8/34 |
| 11,169,507 | B2 | 11/2021 | Chao et al. | |
| 11,314,493 | B1 * | 4/2022 | Stump | G06F 11/3698 |
| 11,567,737 | B1 * | 1/2023 | Stump | G06F 8/34 |
| 11,604,626 | B1 | 3/2023 | Sawant et al. | |
| 11,640,566 | B2 * | 5/2023 | Stump | G05B 19/4188 |
| | | | | 717/107 |
| 11,733,687 | B2 * | 8/2023 | Stump | G06F 3/011 |
| | | | | 703/6 |
| 2002/0191023 | A1 * | 12/2002 | Chandhoke | G05B 19/0426 |
| | | | | 715/771 |
| 2004/0073404 | A1 * | 4/2004 | Brooks | G05B 19/409 |
| | | | | 702/183 |
| 2007/0073750 | A1 * | 3/2007 | Chand | G05B 19/056 |
| 2008/0022259 | A1 * | 1/2008 | MacKlem | G06F 8/34 |
| | | | | 717/113 |
| 2008/0082185 | A1 * | 4/2008 | Hood | G05B 19/409 |
| | | | | 700/83 |
| 2008/0082186 | A1 * | 4/2008 | Hood | G05B 19/042 |
| | | | | 700/83 |
| 2008/0307400 | A1 | 12/2008 | Dalal | |
| 2009/0089709 | A1 * | 4/2009 | Baier | G05B 19/409 |
| | | | | 715/817 |
| 2010/0042376 | A1 * | 2/2010 | Weatherhead | G06F 8/10 |
| | | | | 703/1 |
| 2010/0049335 | A1 * | 2/2010 | Assarsson | G05B 19/042 |
| | | | | 700/17 |
| 2010/0050097 | A1 * | 2/2010 | McGreevy | G06T 11/206 |
| | | | | 707/E17.014 |
| 2012/0095575 | A1 * | 4/2012 | Meinherz | B25J 9/1674 |
| | | | | 700/83 |
| 2013/0342546 | A1 * | 12/2013 | Baier | G05B 19/409 |
| | | | | 345/501 |
| 2017/0346768 | A1 | 11/2017 | Wise | |
| 2018/0129181 | A1 | 5/2018 | Kratzer, III et al. | |
| 2018/0231954 | A1 | 8/2018 | Booker | |
| 2019/0101900 | A1 * | 4/2019 | Miller | G06F 3/1454 |
| 2020/0103894 | A1 | 4/2020 | Cella et al. | |
| 2020/0285907 | A1 * | 9/2020 | Mehr | G06V 30/19173 |
| 2021/0089276 | A1 | 3/2021 | Dunn | |
| 2021/0096824 | A1 | 4/2021 | Stump et al. | |
| 2021/0096827 | A1 | 4/2021 | Stump | |
| 2021/0141614 | A1 * | 5/2021 | Dunn | G06F 8/34 |
| 2021/0294279 | A1 * | 9/2021 | Stump | G06F 8/33 |
| 2021/0397166 | A1 | 12/2021 | Sayyarrodsari | |
| 2022/0083318 | A1 | 3/2022 | Mabote | |
| 2022/0129251 | A1 * | 4/2022 | Dunn | G06F 8/33 |
| 2022/0198261 | A1 * | 6/2022 | Blagodurov | G06N 3/0495 |
| 2022/0292457 | A1 * | 9/2022 | Stump | G06F 8/60 |
| 2023/0091697 | A1 | 3/2023 | Subbunarayanan et al. | |
| 2023/0161838 | A1 | 5/2023 | Shriram et al. | |
| 2023/0259882 | A1 * | 8/2023 | Stump | G06F 9/451 |
| | | | | 717/103 |
| 2023/0280992 | A1 * | 9/2023 | Stump | G06F 8/34 |
| | | | | 717/103 |
| 2023/0324894 | A1 * | 10/2023 | Stump | G05B 19/41885 |
| | | | | 703/6 |
| 2024/0281218 | A1 | 8/2024 | Masad et al. | |
| 2025/0004915 | A1 | 1/2025 | Rudenko et al. | |
| 2025/0055277 | A1 | 2/2025 | Fakhar et al. | |

OTHER PUBLICATIONS

Zhang et al., "Design and Implementation of Industrial Design and Transformation System Based on Artificial Intelligence Technology", 2022, Hindawi Mathematical Problems in Engineering vol. 2022. (Year: 2022).*

Tang et al., "AI Bench Training: Balanced Industry-Standard AI Training Benchmarking", 2021, 2021 IEEE International Symposium on Performance Analysis of Systems and Software (ISPASS). (Year: 2021).*

Liukkonen, S., "Utilizing Generative Artificial Intelligence in Streamlining Cyber-Physical Systems Software Development", 2023, Lappeenranta-Lahti University of Technology LUT Bachelor's Program in Industrial Engineering and Management, Bachelor's Thesis. (Year: 2023).*

Hughes et al., "Generative Adversarial Networks-Enabled Human-Artificial Intelligence Collaborative Applications for Creative and Design", Apr. 2021, Systematic Review. (Year: 2021).*

Non-Final Office Action for U.S. Appl. No. 18/462,674, dated Feb. 26, 2025.

Final office action received for U.S. Appl. No. 18/462,674 dated Jun. 4, 2025, 6 pages.

Notice of Allowance received for U.S. Appl. No. 18/462,674 dated Jul. 24, 2025, 8 pages.

Non-final office action received for U.S. Appl. No. 18/459,881 dated Sep. 16, 2025, 40 pages.

Non-Final office action received for U.S. Appl. No. 18/459,847 dated Jan. 15, 2026, 17 pages.

Codee, "Many Ways to Speed up Your Program", Waybackmachine, Online available at URL: https://www.codee.com/many-ways-to-speed-up-your-program/, Aug. 8, 2022, 4 pages.

Reddit, message thread, "Why Isn't My Hello World Code Working?," published on Dec. 16, 2022, 1 page.

Notice of Allowance received for U.S. Appl. No. 18/462,626 dated Dec. 17, 2025, 16 pages.

Leung et al., "The Generative Artificial Intelligence Large Language Product Design Multi-model Framework for Manufacturing Operations", Journal of the Operational Research Society, Oct. 17, 2025, 28 pages.

Yucekule et al., "Proposal for a Product Classification Strategy for the AI-Assisted Generative Design Approach in Industrial Design Process", Gazi University Journal of Science Part B: Art, Humanities, Design and Planning, vol. 12, No. 4, Oct. 2024, pp. 735-753.

Suner-Pla-Cerda et al., "Designer Experiences and Perspectives on the Role of Generative AI in Industrial Design", AI & Society, Jul. 24, 2025, 24 pages.

Non-Final office action received for U.S. Appl. No. 18/462,661 dated Dec. 31, 2025, 8 pages.

Michael, Stephen St., "Ladder Logic in Programmable Logic Controllers (PLCs)", Technical Articles, Nov. 3, 2019, 7 pages.

Levanduski, Michael , "Can ChatGPT Be Used For Control System Programming?", Technical Articles, EETech Media, LLC., Apr. 25, 2023, 9 pages.

Shuster et al., "BlenderBot 3: A Deployed Conversational Agent that Continually Learns to Responsibly Engage", arXiv:2208.03188v3, Aug. 10, 2022, 38 pages.

* cited by examiner

Figure 3:
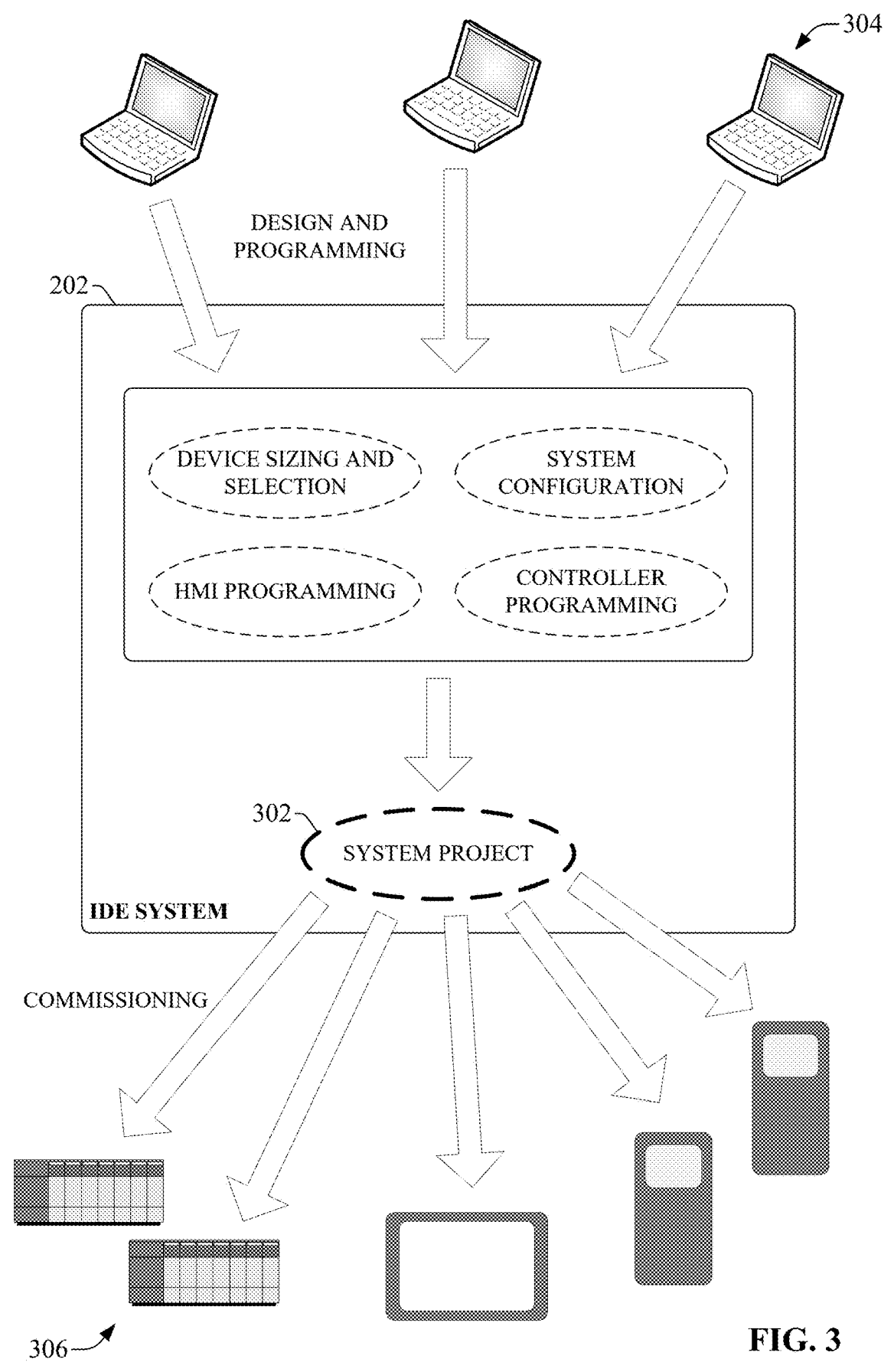

DESIGN AND
PROGRAMMING

202

DEVICE SIZING AND
SELECTION

SYSTEM
CONFIGURATION

HMI PROGRAMMING

CONTROLLER
PROGRAMMING

302

SYSTEM PROJECT

IDE SYSTEM

COMMISSIONING

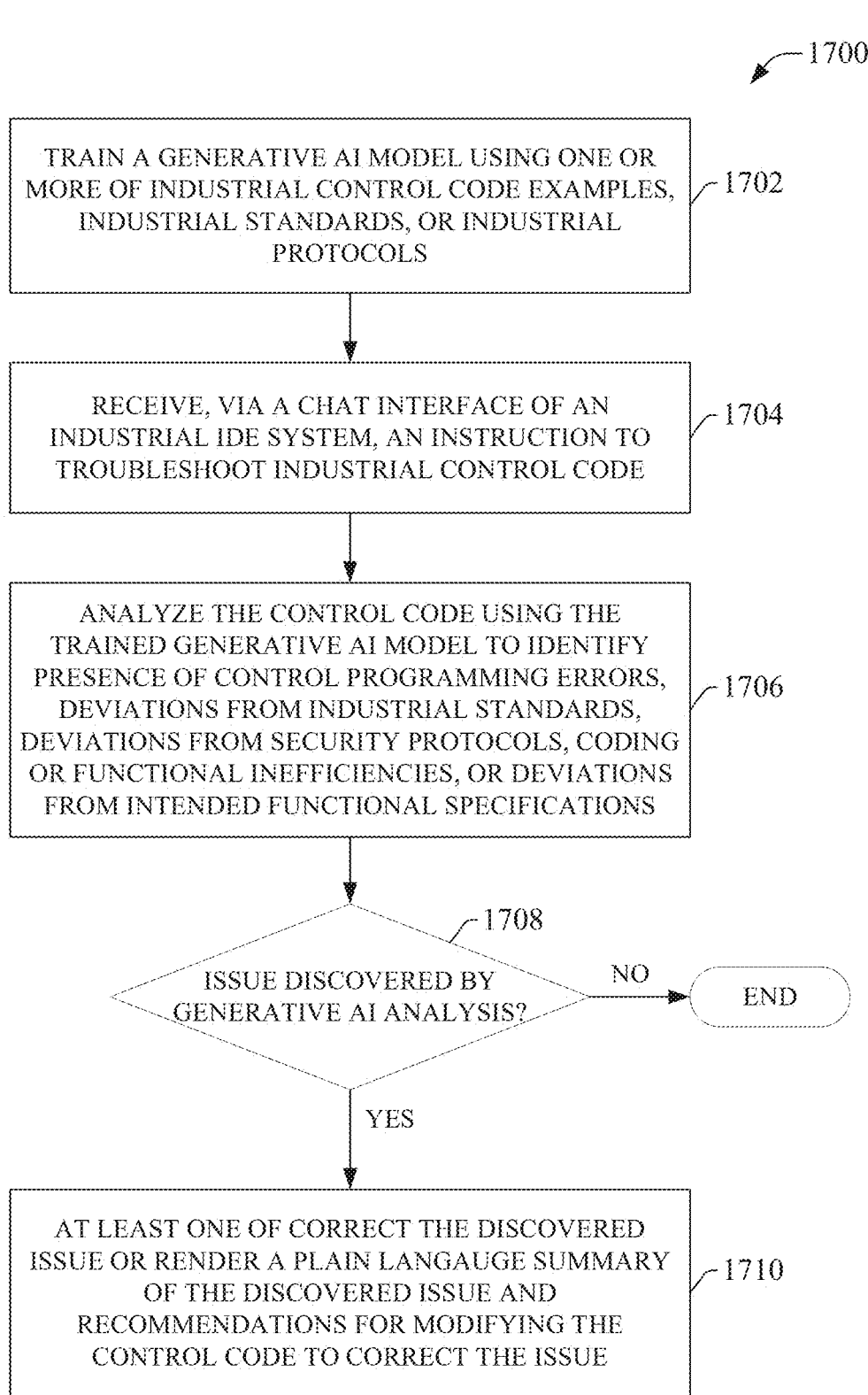

1700

TRAIN A GENERATIVE AI MODEL USING ONE OR MORE OF INDUSTRIAL CONTROL CODE EXAMPLES, INDUSTRIAL STANDARDS, OR INDUSTRIAL PROTOCOLS — 1702

RECEIVE, VIA A CHAT INTERFACE OF AN INDUSTRIAL IDE SYSTEM, AN INSTRUCTION TO TROUBLESHOOT INDUSTRIAL CONTROL CODE — 1704

ANALYZE THE CONTROL CODE USING THE TRAINED GENERATIVE AI MODEL TO IDENTIFY PRESENCE OF CONTROL PROGRAMMING ERRORS, DEVIATIONS FROM INDUSTRIAL STANDARDS, DEVIATIONS FROM SECURITY PROTOCOLS, CODING OR FUNCTIONAL INEFFICIENCIES, OR DEVIATIONS FROM INTENDED FUNCTIONAL SPECIFICATIONS — 1706

1708

ISSUE DISCOVERED BY GENERATIVE AI ANALYSIS?    NO    END

YES

AT LEAST ONE OF CORRECT THE DISCOVERED ISSUE OR RENDER A PLAIN LANGAUGE SUMMARY OF THE DISCOVERED ISSUE AND RECOMMENDATIONS FOR MODIFYING THE CONTROL CODE TO CORRECT THE ISSUE — 1710

FIG. 17

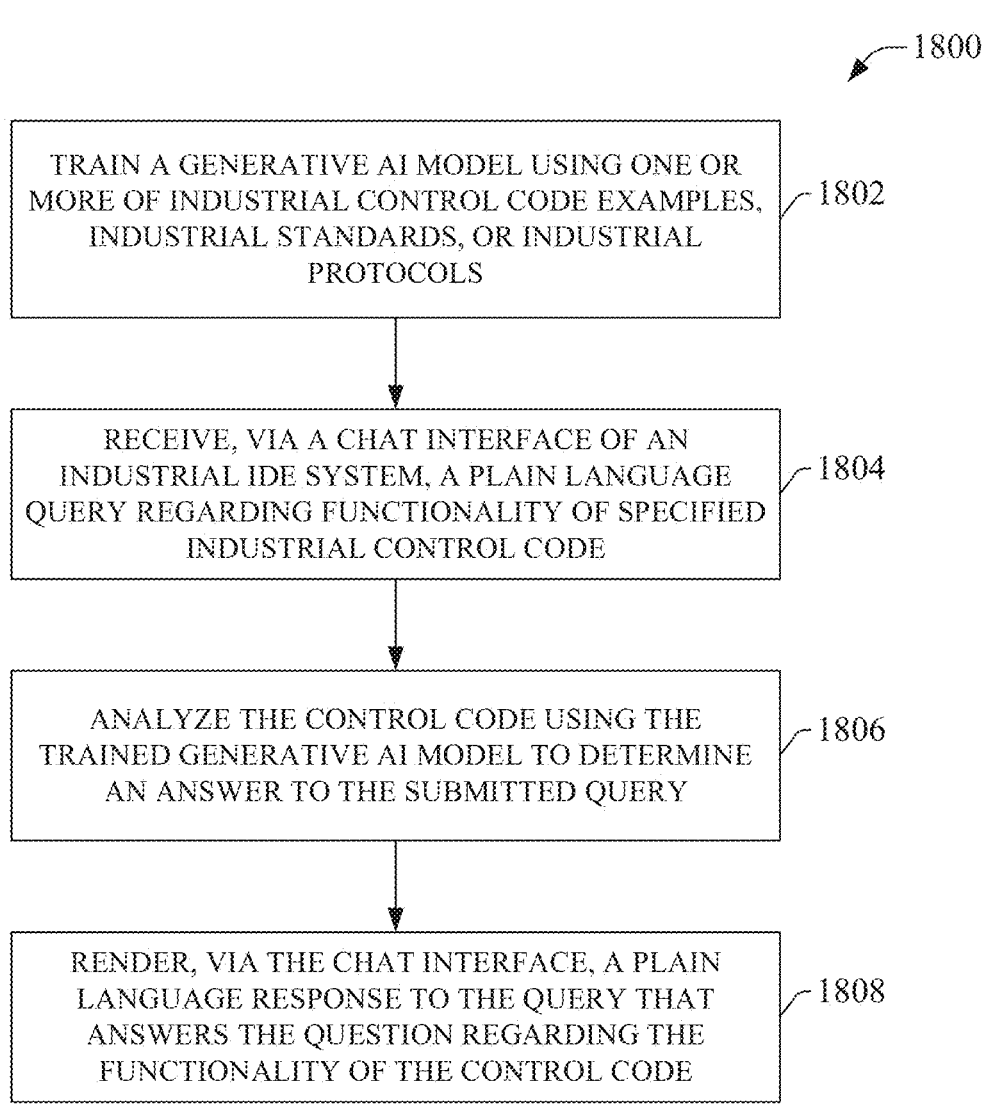

1800

TRAIN A GENERATIVE AI MODEL USING ONE OR MORE OF INDUSTRIAL CONTROL CODE EXAMPLES, INDUSTRIAL STANDARDS, OR INDUSTRIAL PROTOCOLS — 1802

RECEIVE, VIA A CHAT INTERFACE OF AN INDUSTRIAL IDE SYSTEM, A PLAIN LANGUAGE QUERY REGARDING FUNCTIONALITY OF SPECIFIED INDUSTRIAL CONTROL CODE — 1804

ANALYZE THE CONTROL CODE USING THE TRAINED GENERATIVE AI MODEL TO DETERMINE AN ANSWER TO THE SUBMITTED QUERY — 1806

RENDER, VIA THE CHAT INTERFACE, A PLAIN LANGUAGE RESPONSE TO THE QUERY THAT ANSWERS THE QUESTION REGARDING THE FUNCTIONALITY OF THE CONTROL CODE — 1808

FIG. 18

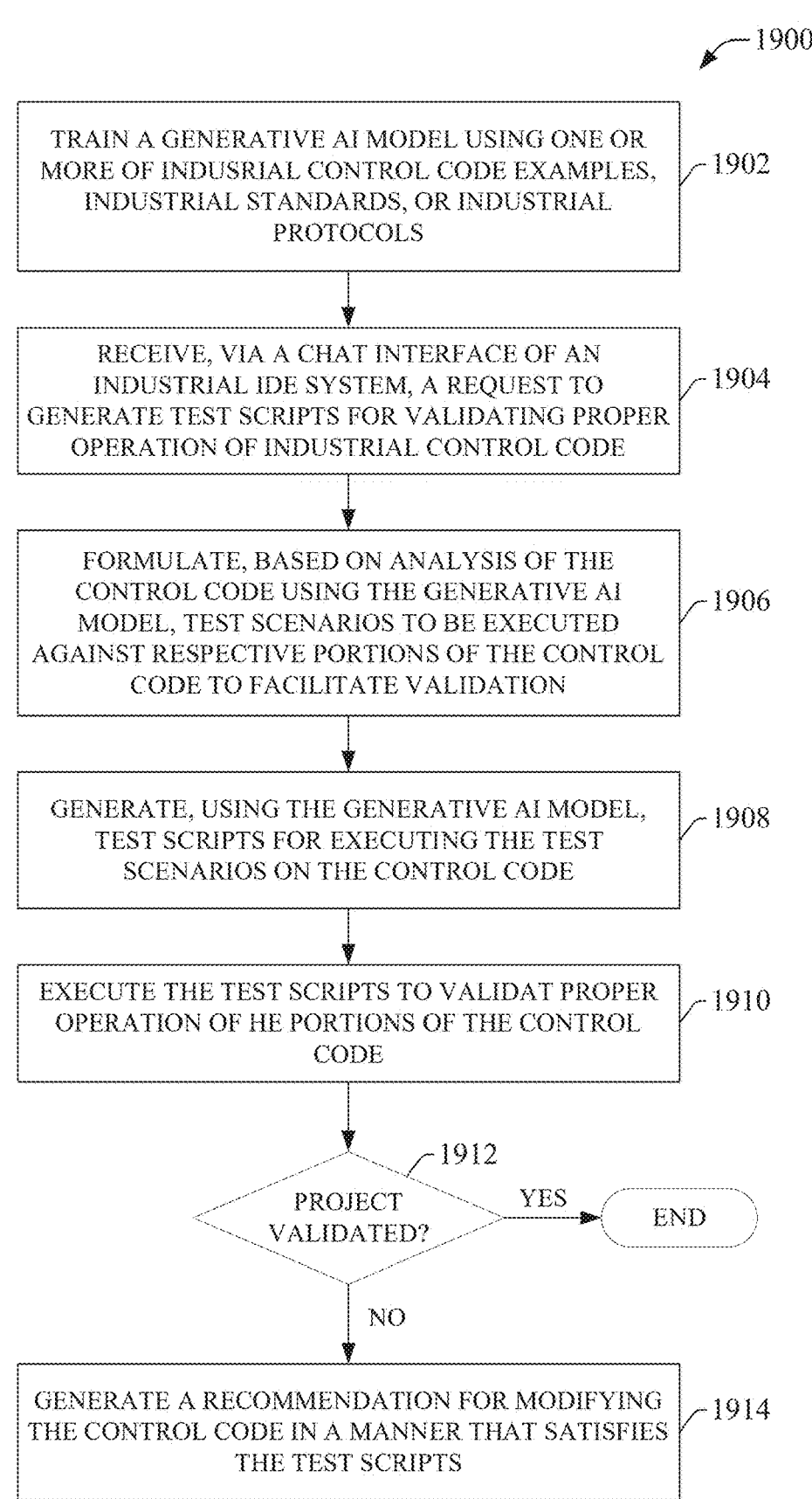

1900

TRAIN A GENERATIVE AI MODEL USING ONE OR MORE OF INDUSRIAL CONTROL CODE EXAMPLES, INDUSTRIAL STANDARDS, OR INDUSTRIAL PROTOCOLS — 1902

RECEIVE, VIA A CHAT INTERFACE OF AN INDUSTRIAL IDE SYSTEM, A REQUEST TO GENERATE TEST SCRIPTS FOR VALIDATING PROPER OPERATION OF INDUSTRIAL CONTROL CODE — 1904

FORMULATE, BASED ON ANALYSIS OF THE CONTROL CODE USING THE GENERATIVE AI MODEL, TEST SCENARIOS TO BE EXECUTED AGAINST RESPECTIVE PORTIONS OF THE CONTROL CODE TO FACILITATE VALIDATION — 1906

GENERATE, USING THE GENERATIVE AI MODEL, TEST SCRIPTS FOR EXECUTING THE TEST SCENARIOS ON THE CONTROL CODE — 1908

EXECUTE THE TEST SCRIPTS TO VALIDAT PROPER OPERATION OF HE PORTIONS OF THE CONTROL CODE — 1910

PROJECT VALIDATED? — 1912

YES → END

NO

GENERATE A RECOMMENDATION FOR MODIFYING THE CONTROL CODE IN A MANNER THAT SATISFIES THE TEST SCRIPTS — 1914

FIG. 19

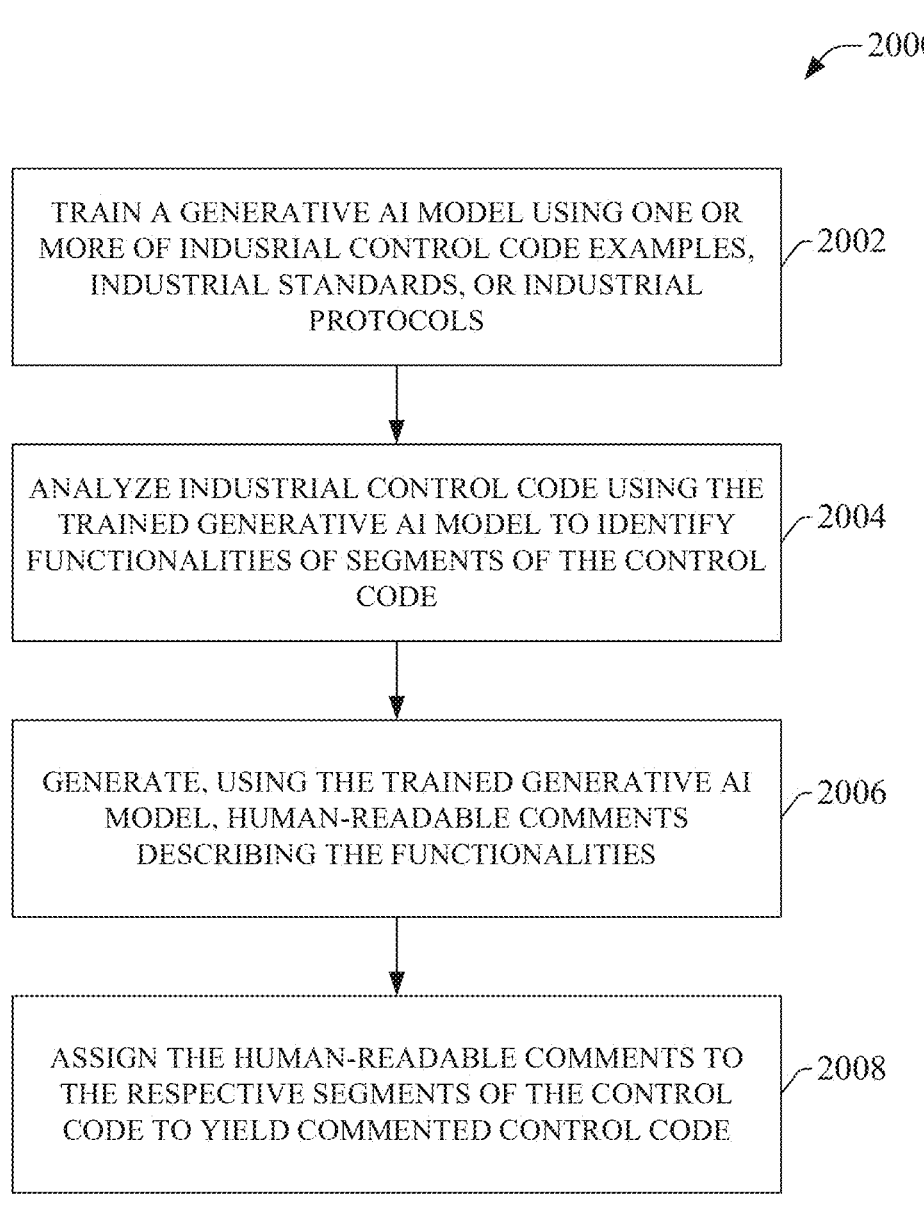

2000

TRAIN A GENERATIVE AI MODEL USING ONE OR MORE OF INDUSRIAL CONTROL CODE EXAMPLES, INDUSTRIAL STANDARDS, OR INDUSTRIAL PROTOCOLS — 2002

ANALYZE INDUSTRIAL CONTROL CODE USING THE TRAINED GENERATIVE AI MODEL TO IDENTIFY FUNCTIONALITIES OF SEGMENTS OF THE CONTROL CODE — 2004

GENERATE, USING THE TRAINED GENERATIVE AI MODEL, HUMAN-READABLE COMMENTS DESCRIBING THE FUNCTIONALITIES — 2006

ASSIGN THE HUMAN-READABLE COMMENTS TO THE RESPECTIVE SEGMENTS OF THE CONTROL CODE TO YIELD COMMENTED CONTROL CODE — 2008

FIG. 20

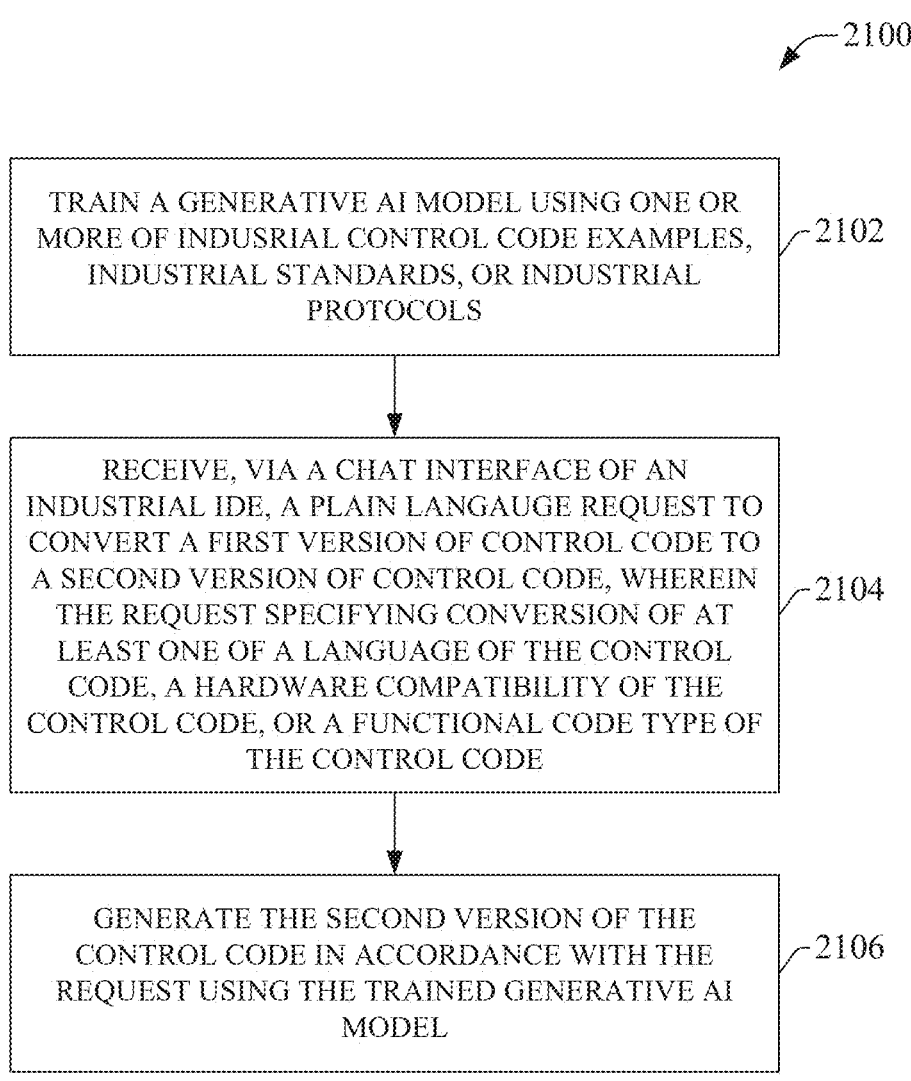

2100

TRAIN A GENERATIVE AI MODEL USING ONE OR MORE OF INDUSRIAL CONTROL CODE EXAMPLES, INDUSTRIAL STANDARDS, OR INDUSTRIAL PROTOCOLS
2102

RECEIVE, VIA A CHAT INTERFACE OF AN INDUSTRIAL IDE, A PLAIN LANGAUGE REQUEST TO CONVERT A FIRST VERSION OF CONTROL CODE TO A SECOND VERSION OF CONTROL CODE, WHEREIN THE REQUEST SPECIFYING CONVERSION OF AT LEAST ONE OF A LANGUAGE OF THE CONTROL CODE, A HARDWARE COMPATIBILITY OF THE CONTROL CODE, OR A FUNCTIONAL CODE TYPE OF THE CONTROL CODE
2104

GENERATE THE SECOND VERSION OF THE CONTROL CODE IN ACCORDANCE WITH THE REQUEST USING THE TRAINED GENERATIVE AI MODEL
2106

FIG. 21

GENERATIVE AI FOR INDUSTRIAL AUTOMATION CONTROL DESIGN ENVIRONMENT

TECHNICAL FIELD

The subject matter disclosed herein relates generally to industrial automation systems, and, for example, to industrial programming development platforms.

BACKGROUND ART

The various control, monitoring, and analytical devices that make up an industrial environment are typically programmed or configured using respective configuration applications specific to each type of device. For example, industrial controllers are typically configured and programmed using a control programming development application such as a ladder logic editor. Using such development platforms, a designer can write control programming for carrying out a desired industrial sequence or process and download the resulting program files to the controller. Separately, developers design visualization screens and associated navigation structures for human-machine interfaces (HMIs) using an HMI development platform and download the resulting visualization files to an HMI terminal for execution.

The conventional approach to configuring and programming industrial devices to carry out prescribed manufacturing processes requires not only specialized knowledge of the programming languages and device configuration settings used to configure the devices, but also an expert understanding of industrial control process in general, including knowledge of common industrial standards and specifics of various types of automation applications. This restricts the development of industrial control projects to those engineers having the required level of specialist knowledge, and also extends the time required to develop industrial control solutions.

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, a system is provided, comprising a user interface component configured to render a chat interface configured to receive industrial design input data as plain language input data; generative artificial intelligence (AI) component configured to infer functional requirements of an industrial control system for an industrial automation system based on generative AI analysis of the industrial design input data using a generative AI model, where the generative AI model has been trained using training data comprising at least one of industrial control code samples, industrial standards data, or industrial protocol data; and a project generation component configured to generate industrial control code designed to satisfy the functional requirements.

Also, one or more embodiments provide a method, comprising training, by an industrial integrated development environment (IDE) system comprising a processor, a generative artificial intelligence (AI) model using training data comprising at least one of industrial control code samples, industrial standards data, or industrial protocol data; receiving, via a chat interface of the industrial IDE system, industrial design input data formatted as a plain language input; inferring, by the industrial IDE system, functional requirements of an industrial control system for an industrial automation system based on generative artificial intelligence (AI) analysis of the industrial design input data using the generative AI model; and generating, by the industrial IDE system, industrial control code designed to satisfy the functional requirements.

Also, according to one or more embodiments, a non-transitory computer-readable medium is provided having stored thereon instructions that, in response to execution, cause an industrial integrated development environment (IDE) to perform operations, the operations comprising receiving industrial design input data formatted as a plain language input; inferring functional requirements of an industrial control system for an industrial automation system based on generative artificial intelligence (AI) analysis of the industrial design input data using a generative AI model, wherein the generative AI model is trained using training data comprising at least one of industrial control code samples, industrial standards data, or industrial protocol data; and generating industrial control code designed to satisfy the functional requirements.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

FIG. 3 is a diagram illustrating a generalized architecture of the industrial IDE system.

FIG. 17 is a flowchart of an example methodology for using generative AI to troubleshoot or debug software components of an industrial control system project.

FIG. 18 is a flowchart of an example methodology for providing information about industrial control code using a trained generative AI model.

FIG. 19 is a flowchart of an example methodology for generating test scripts designed to validate proper operation of industrial control code.

FIG. 20 is a flowchart of an example methodology for using generative AI to create program comments and documentation for industrial control code.

FIG. 21 is a flowchart of an example methodology for using generative AI to perform various types of conversions on submitted industrial control code.

DETAILED DESCRIPTION

Figure 1:
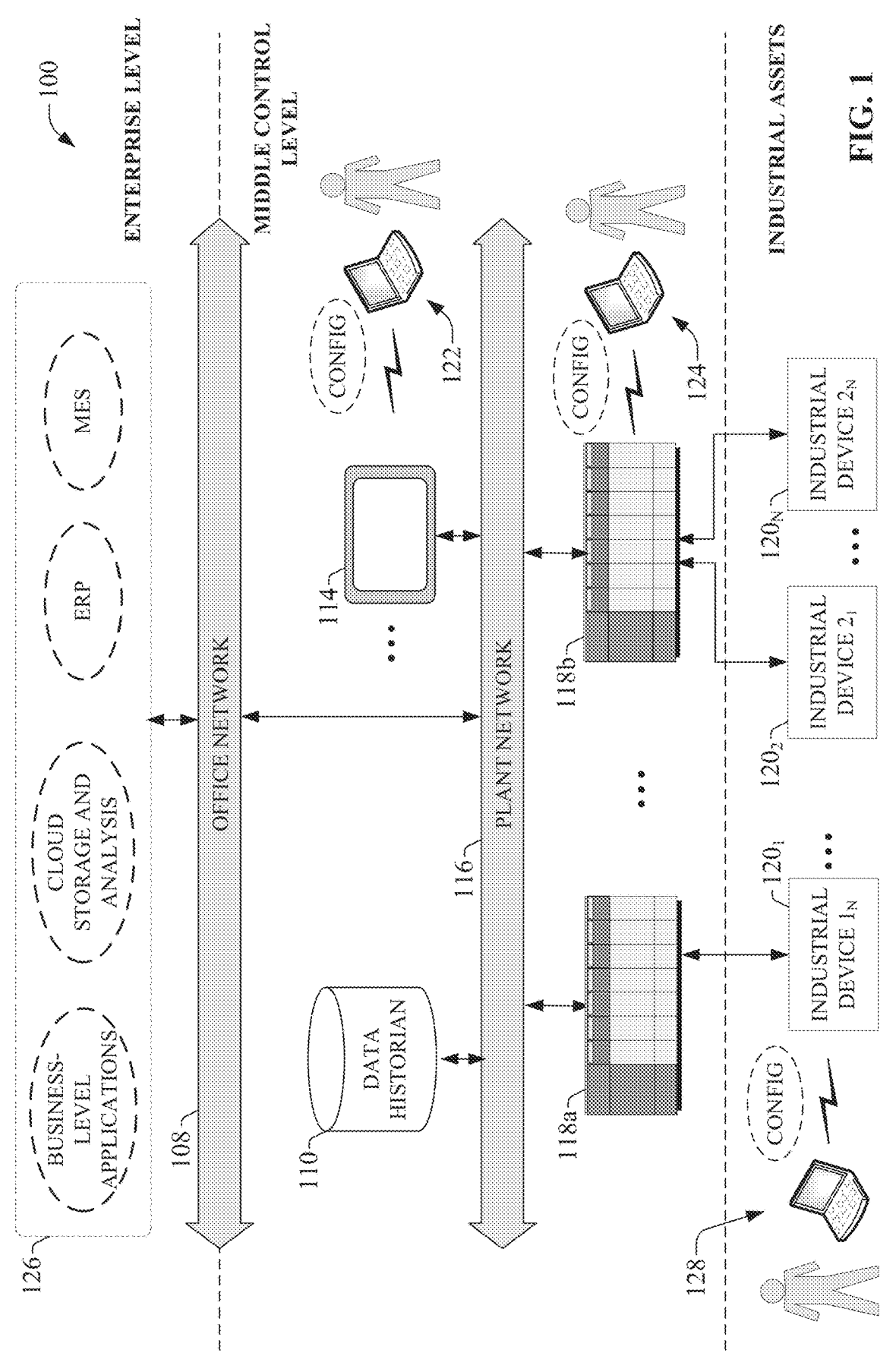
FIG. 1 is a block diagram of an example industrial control environment.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

FIG. 1 is a block diagram of an example industrial control environment 100. In this example, a number of industrial controllers 118 are deployed throughout an industrial plant environment to monitor and control respective industrial systems or processes relating to product manufacture, machining, motion control, batch processing, material handling, or other such industrial functions. Industrial controllers 118 typically execute respective control programs to facilitate monitoring and control of industrial devices 120 making up the controlled industrial assets or systems (e.g., industrial machines). One or more industrial controllers 118 may also comprise a soft controller executed on a personal computer or other hardware platform, or on a cloud platform. Some hybrid devices may also combine controller functionality with other functions (e.g., visualization). The control programs executed by industrial controllers 118 can comprise substantially any type of code capable of processing input signals read from the industrial devices 120 and controlling output signals generated by the industrial controllers 118, including but not limited to ladder logic, sequential function charts, function block diagrams, or structured text.

Industrial devices 120 may include both input devices that provide data relating to the controlled industrial systems to the industrial controllers 118, and output devices that respond to control signals generated by the industrial controllers 118 to control aspects of the industrial systems. Example input devices can include telemetry devices (e.g., temperature sensors, flow meters, level sensors, pressure sensors, etc.), manual operator control devices (e.g., push buttons, selector switches, etc.), safety monitoring devices (e.g., safety mats, safety pull cords, light curtains, etc.), and other such devices. Output devices may include motor drives, pneumatic actuators, signaling devices, robot control inputs, valves, pumps, and the like.

Industrial controllers 118 may communicatively interface with industrial devices 120 over hardwired or networked connections. For example, industrial controllers 118 can be equipped with native hardwired inputs and outputs that communicate with the industrial devices 120 to effect control of the devices. The native controller I/O can include digital I/O that transmits and receives discrete voltage signals to and from the field devices, or analog I/O that transmits and receives analog voltage or current signals to and from the devices. The controller I/O can communicate with a controller's processor over a backplane such that the digital and analog signals can be read into and controlled by the control programs. Industrial controllers 118 can also communicate with industrial devices 120 over a network using, for example, a communication module or an integrated networking port. Exemplary networks can include the Internet, intranets, Ethernet, DeviceNet, ControlNet, Data Highway and Data Highway Plus (DH/DH+), Remote I/O, Fieldbus, Modbus, Profibus, wireless networks, serial protocols, and the like. The industrial controllers 118 can also store persisted data values that can be referenced by their associated control programs and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.). Similarly, some intelligent devices-including but not limited to motor drives, instruments, or condition monitoring modules—may store data values that are used for control and/or to visualize states of operation. Such devices may also capture time-series data or events on a log for later retrieval and viewing.

Industrial automation systems often include one or more human-machine interfaces (HMIs) 114 that allow plant personnel to view telemetry and status data associated with the automation systems, and to control some aspects of system operation. HMIs 114 may communicate with one or more of the industrial controllers 118 over a plant network 116, and exchange data with the industrial controllers to facilitate visualization of information relating to the controlled industrial processes on one or more pre-developed operator interface screens. HMIs 114 can also be configured to allow operators to submit data to specified data tags or memory addresses of the industrial controllers 118, thereby providing a means for operators to issue commands to the controlled systems (e.g., cycle start commands, device actuation commands, etc.), to modify setpoint values, etc. HMIs 114 can generate one or more display screens through which the operator interacts with the industrial controllers 118, and thereby with the controlled processes and/or systems. Example display screens can visualize present states of industrial systems or their associated devices using graphical representations of the processes that display metered or calculated values, employ color or position animations based on state, render alarm notifications, or employ other such techniques for presenting relevant data to the operator. Data presented in this manner is read from industrial controllers 118 by HMIs 114 and presented on one or more of the display screens according to display formats chosen by the HMI developer. HMIs may comprise fixed location or mobile devices with either user-installed or pre-installed operating systems, and either user-installed or pre-installed graphical application software.

Some industrial environments may also include other systems or devices relating to specific aspects of the controlled industrial systems. These may include, for example, a data historian 110 that aggregates and stores production information collected from the industrial controllers 118 or other data sources, device documentation stores containing electronic documentation for the various industrial devices making up the controlled industrial systems, inventory tracking systems, work order management systems, repositories for machine or process drawings and documentation, vendor product documentation storage, vendor knowledgebases, internal knowledgebases, work scheduling applications, or other such systems, some or all of which may reside on an office network 108 of the industrial environment.

Higher-level systems 126 may carry out functions that are less directly related to control of the industrial automation systems on the plant floor, and instead are directed to long term planning, high-level supervisory control, analytics, reporting, or other such high-level functions. These systems 126 may reside on the office network 108 at an external location relative to the plant facility, or on a cloud platform with access to the office and/or plant networks. Higher-level systems 126 may include, but are not limited to, cloud storage and analysis systems, big data analysis systems, manufacturing execution systems, data lakes, reporting systems, etc. In some scenarios, applications running at these higher levels of the enterprise may be configured to analyze control system operational data, and the results of this analysis may be fed back to an operator at the control system or directly to a controller 118 or device 120 in the control system.

The various control, monitoring, and analytical devices that make up an industrial environment are typically programmed or configured using respective configuration applications specific to each type of device. For example, industrial controllers 118 are typically configured and programmed using a control programming development application such as a ladder logic editor (e.g., executing on a client device 124). Using such development platforms, a designer can write control programming (e.g., ladder logic, structured text, function block diagrams, etc.) for carrying out a desired industrial sequence or process and download the resulting program files to the controller 118. Separately, developers design visualization screens and associated navigation structures for HMIs 114 using an HMI development platform (e.g., executing on client device 122) and download the resulting visualization files to an HMI terminal for execution. Some industrial devices 120—such as motor drives, telemetry devices, safety input devices, etc.—may also require configuration using dedicated device configuration tools (e.g., executing on client device 128). Such device configuration tools may be used to set device parameters or operating modes (e.g., high/low limits, output signal formats, scale factors, energy consumption modes, etc.).

The conventional approach to configuring and programming industrial devices to carry out prescribed manufacturing processes requires not only specialized knowledge of the programming languages and device configuration settings used to configure the devices, but also an expert understanding of industrial control process in general, including knowledge of common industrial standards and specifics of various types of automation applications. This restricts the development of industrial control projects to those engineers having the required level of specialist knowledge, and also extends the time required to develop industrial control solutions.

To address at least some of these or other issues, one or more embodiments described herein provide an integrated development environment (IDE) for designing, programming, and configuring aspects of an industrial automation system using generative artificial intelligence (AI) techniques. Embodiments of the industrial IDE can make use of a generative AI model and associated neural networks to generate portions of an industrial automation project in accordance with specified functional requirements, which can be provided to the industrial IDE system in intuitive formats (e.g., spoken or written plain language text, images representing system requirements or available control devices, etc.). In general, the industrial IDE supports features that span the full automation lifecycle, including design (e.g., device selection and sizing, controller programming, visualization development, device configuration, testing, etc.); installation, configuration and commissioning; operation, improvement, and administration; and troubleshooting, expanding, and upgrading.

Figure 2:
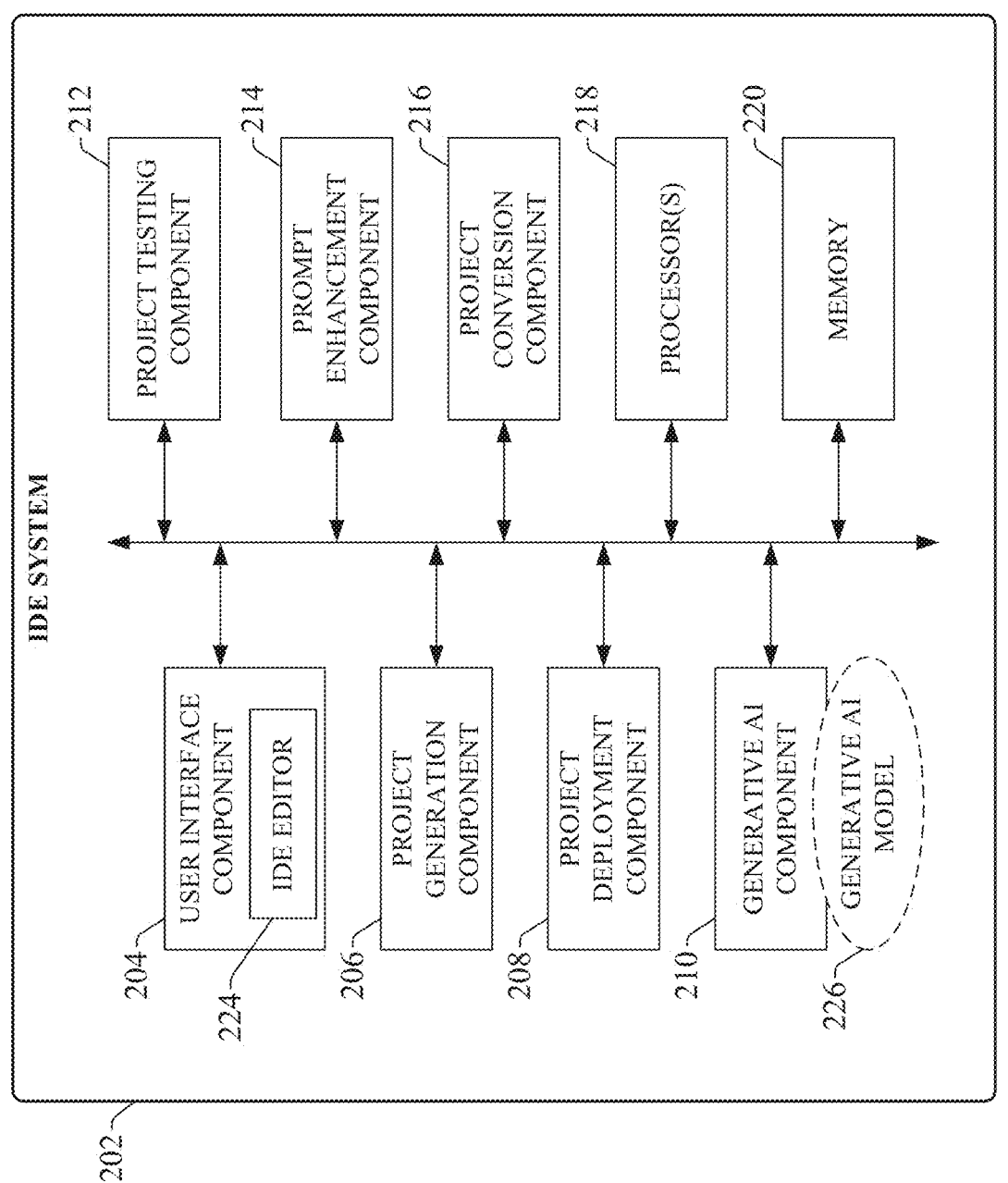
FIG. 2 is a block diagram of an example integrated development environment (IDE) system.

FIG. 2 is a block diagram of an example integrated development environment (IDE) system 202 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

IDE system 202 can include a user interface component 204 including an IDE editor 224, a project generation component 206, a project deployment component 208, a generative AI component 210, a project testing component 212, a a prompt enhancement component 214, a prompt enhancement component 218, a project conversion component 216, one or more processors 218, and memory 220. In various embodiments, one or more of the user interface component 204, project generation component 206, project deployment component 208, generative AI component 210, project testing component 212, prompt enhancement component 214, project conversion component 216, the one or more processors 218, and memory 220 can be electrically and/or communicatively coupled to one another to perform one or more of the functions of the IDE system 202. In some embodiments, components 204, 206, 208, 210, 212, 214, and 216 can comprise software instructions stored on memory 220 and executed by processor(s) 218. IDE system 202 may also interact with other hardware and/or software components not depicted in FIG. 2. For example, processor(s) 218 may interact with one or more external user interface devices, such as a keyboard, a mouse, a display monitor, a touchscreen, or other such interface devices.

User interface component 204 can be configured to receive user input and to render output to the user in any suitable format (e.g., visual, audio, tactile, etc.). In some embodiments, user interface component 204 can be configured to communicatively interface with an IDE client that executes on a client device (e.g., a laptop computer, tablet computer, smart phone, etc.) that is communicatively connected to the IDE system 202 (e.g., via a hardwired or wireless connection). The user interface component 204 can then receive user input data and render output data via the IDE client. In other embodiments, user interface component 314 can be configured to generate and serve interface screens to a client device (e.g., program development screens), and exchange data via these interface screens. Input data that can be received via various embodiments of user interface component 204 can include, but is not limited to, plain language chat input, programming code, industrial design specifications or goals submitted in various formats (e.g., plain text, image information, etc.), engineering drawings, AR/VR input, domain-specific language (DSL) definitions, video or image data, project testing scripts, or other such input. Output data rendered by various embodiments of user interface component 204 can include plain language responses to chat input, program code, programming feedback (e.g., error and highlighting, coding suggestions, etc.), programming and visualization development screens, project testing results, or other such outputs.

Project generation component 206 can be configured to create a system project comprising one or more project files based on design input received via the user interface component 204, assisted by application of generative AI. Project deployment component 208 can be configured to commission the system project created by the project generation component 206 to appropriate industrial devices (e.g., controllers, HMI terminals, motor drives, AR/VR systems, etc.) for execution.

Generative AI component 210 can be configured to assist the project generation component 206 in generating portions of the system project—e.g., industrial control code, HMI applications, device configuration settings, etc.—using generative AI. To this end, the generative AI component 210 can leverage a generative AI model 226 and associated neural networks in connection with prompting a designer for information that can be used to accurately ascertain the functional requirements for the industrial controls system being designed, and generating the relevant portions of the system project to align with the functional requirements gleaned from the designer.

Project testing component 212 can be configured to execute testing scripts that test and validate proper execution of various aspects of a system project (e.g., portions of industrial control code or HMI code). In some embodiments, the test scripts themselves can be generated by the generative AI component 210, which can infer appropriate test cases or scenarios for portions of the system project to be tested and generate appropriate test scripts designed to validate those test cases. The prompt enhancement component 214 can be configured to operate in conjunction with the generative AI component 210 to provision or enhance prompts to the generative AI model 226. The project conversion component 216 can be configured to leverage the generative AI model 226 to perform various types of conversion on control code or other software components of an industrial system project.

The one or more processors 218 can perform one or more of the functions described herein with reference to the systems and/or methods disclosed. Memory 220 can be a computer-readable storage medium storing computer-executable instructions and/or information for performing the functions described herein with reference to the systems and/or methods disclosed.

FIG. 3 is a diagram illustrating a generalized architecture of the industrial IDE system 202 according to one or more embodiments. Industrial IDE system 202 can implement a common set of services and workflows spanning design, commissioning, operation, and/or maintenance. In terms of design, the IDE system 202 can support such development functions as industrial controller programming and HMI development, sizing and selection of system components, device/system configuration, AR/VR visualizations, and other features. The IDE system 202 can also include tools that simplify and automate commissioning of the resulting project and assist with subsequent administration of the deployed system during runtime.

Embodiments of the IDE system 202 that are implemented on a cloud platform also facilitate collaborative project development whereby multiple developers 304 contribute design and programming input to a common automation system project 302. Collaborative tools supported by the IDE system can manage design contributions from the multiple contributors and perform version control of the aggregate system project 302 to ensure project consistency.

Based on design and programming input from one or more developers 304, IDE system 202 generates a system project 302 comprising one or more project files. The system project 302 encodes one or more of control programming; HMI, AR, and/or VR visualizations; device or sub-system configuration data (e.g., motor drive parameters, vision system configurations, telemetry device parameters, safety zone definitions, etc.); or other such aspects of an industrial automation system being designed. IDE system 202 can translate the system project 302 to one or more executable files that can be executed on their corresponding target devices 306, and deploy the executable files to their corresponding target devices 306 for execution, thereby commissioning the system project 302 to the plant floor for implementation of the automation project.

Figure 4:
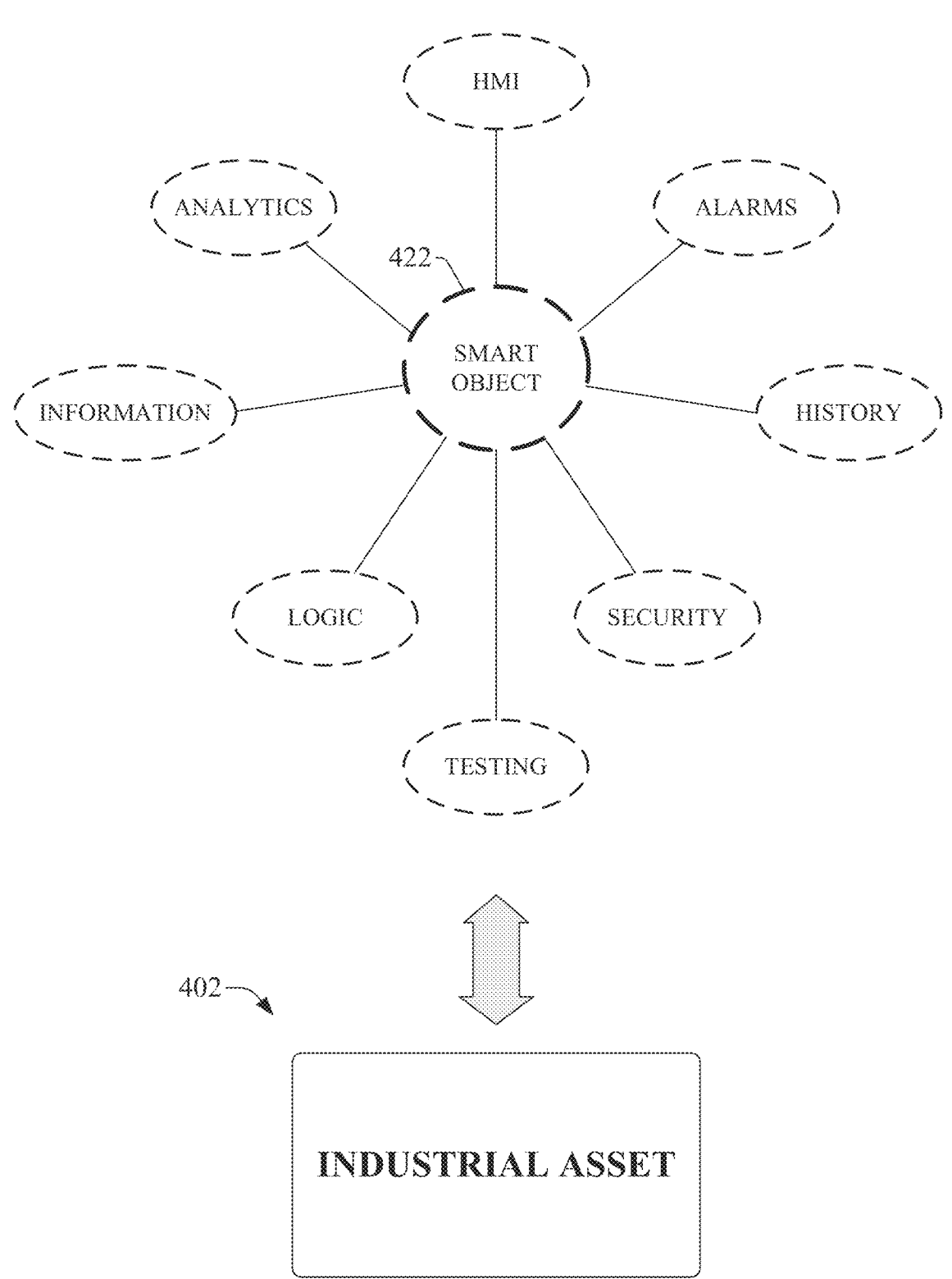
FIG. 4 is a diagram illustrating several example smart object properties that can be leveraged by the IDE system in connection with building, deploying, and executing a system project.

To support enhanced development capabilities, some embodiments of IDE system 202 can be built on an object-based data model rather than a tag-based architecture. Smart objects serve as the building block for this object-based development architecture. FIG. 4 is a diagram illustrating several example smart object properties that can be leveraged by the IDE system 202 in connection with building, deploying, and executing a system project 302. Smart objects 422 can be created and augmented during design, integrated into larger data models, and consumed during runtime. These smart objects 422 provide a common data structure across the IDE system 202 and can be stored in an object library (e.g., part of memory 220) for reuse. The object library can store predefined smart objects 422 representing various classifications of real-world industrial assets 402, including but not limited to pumps, tanks, values, motors, motor drives (e.g., variable frequency drives), industrial robots, actuators (e.g., pneumatic or hydraulic actuators), or other such assets. Smart objects 422 can represent elements at substantially any level of an industrial enterprise, including individual devices, machines made up of many industrial devices and components (some of which may be associated with their own smart objects 422), and entire production lines or process control systems.

A smart object 422 for a given type of industrial asset can encode such aspects as 2D or 3D visualizations, alarms, control coding (e.g., logic or other type of control programming), analytics, startup procedures, testing protocols and scripts, validation reports, simulations, schematics, security protocols, and other such properties associated with the industrial asset 402 represented by the object 422. Smart objects 422 can also be geotagged with location information identifying the location of the associated asset. During runtime of the system project 302, the smart object 422 corresponding to a given real-world asset 402 can also record status or operational history data for the asset. In general, smart objects 422 serve as programmatic representations of their corresponding industrial assets 402, and can be incorporated into a system project 302 as elements of control code, a 2D or 3D visualization, a knowledgebase or maintenance guidance system for the industrial assets, or other such aspects.

Figure 5:
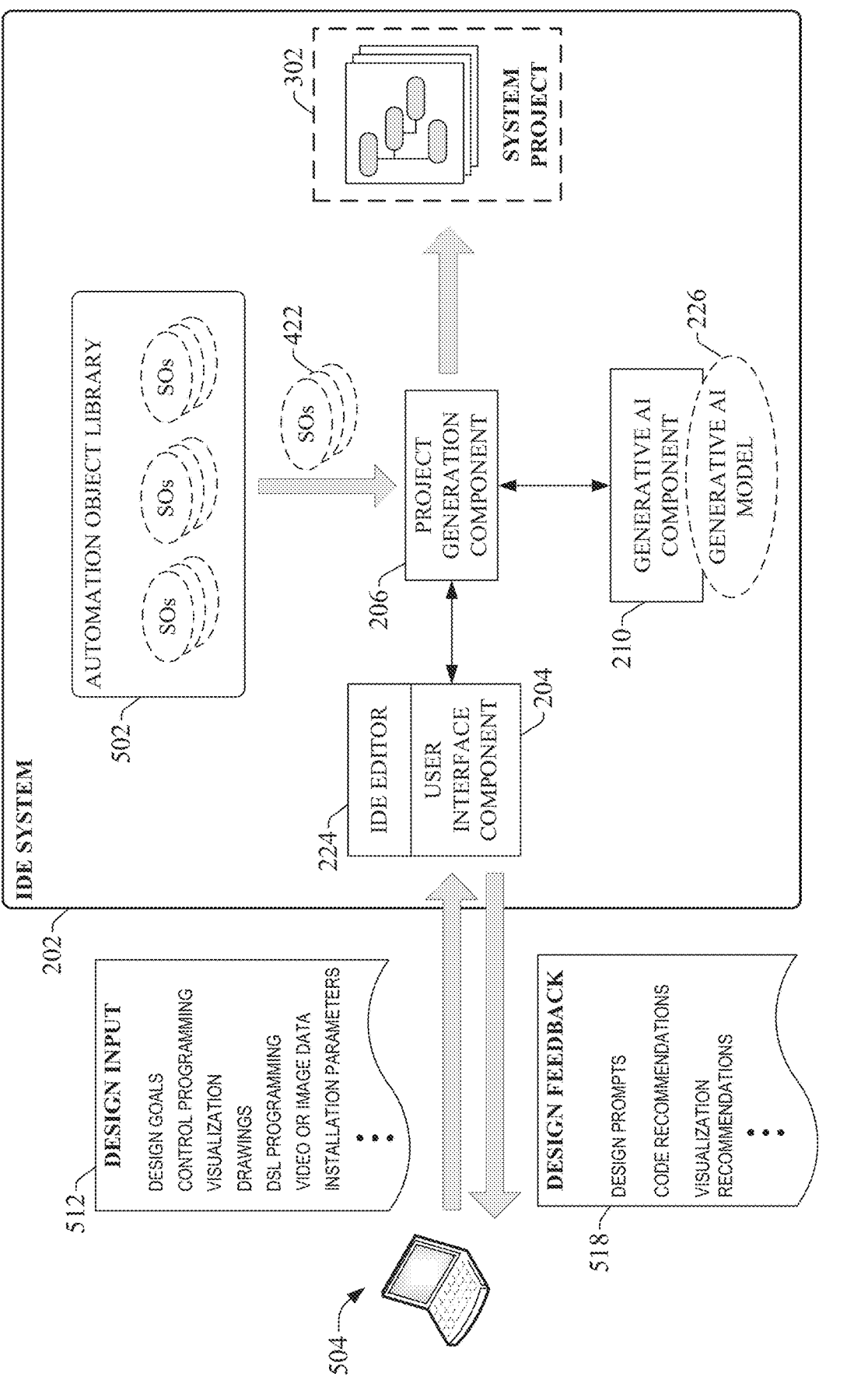
FIG. 5 is a diagram illustrating example data flows associated with creation of a system project for an automation system being designed using IDE system.

FIG. 5 is a diagram illustrating example data flows associated with creation of a system project 302 for an automation system being designed using IDE system 202 according to one or more embodiments. A client device 504 (e.g., a laptop computer, tablet computer, desktop computer, mobile device, wearable AR/VR appliance, etc.) owned by a user with suitable authentication credentials can access the IDE system's project development tools and leverage these tools to create a system project 302—including one or more of industrial control code, an HMI application, device configuration settings, or other such aspects of an industrial control project—for an automation system being developed. Through interaction with the system's user interface component 204, developers can submit design input 512 to the IDE system 202 in various supported formats. Design input 512 can comprise explicit control code (e.g., control logic, structured text, sequential function charts, etc.), visualization programming, and device configuration parameter definitions.

Additionally, design input 512 can include other types of input conveying the functional specifications or design goals for the automation system, and the system's generative AI component 210 can generate portions of the system project 302 to align with these design goals using generative AI techniques. This type of design input 512 can include, but is not limited to, plain language descriptions of the functional specifications submitted via a chat interface rendered by the user interface component 204, engineering drawings (e.g., P&ID drawings, mechanical drawings, flow diagrams, electrical I/O drawings, etc.) representing portions of the industrial automation system for which the system project 302 is being developed, video or image data representing the automation system, digital three-dimensional models of portions of the automation system (e.g., machines that make up the automation system), installation parameters or constraints, or other such input 512.

Based on this design input 512, user interface component 204 can render design feedback 518 designed to assist the developer in connection with developing a system project 302 for configuration, control, and visualization of an industrial automation system. At least some of this design feedback 518 can comprise prompts generated by the generative AI component 210 requesting specific items of information that can be used to generate portions of the system project 302 using generative AI. These generative AI features will be described in more detail herein.

Figure 6:
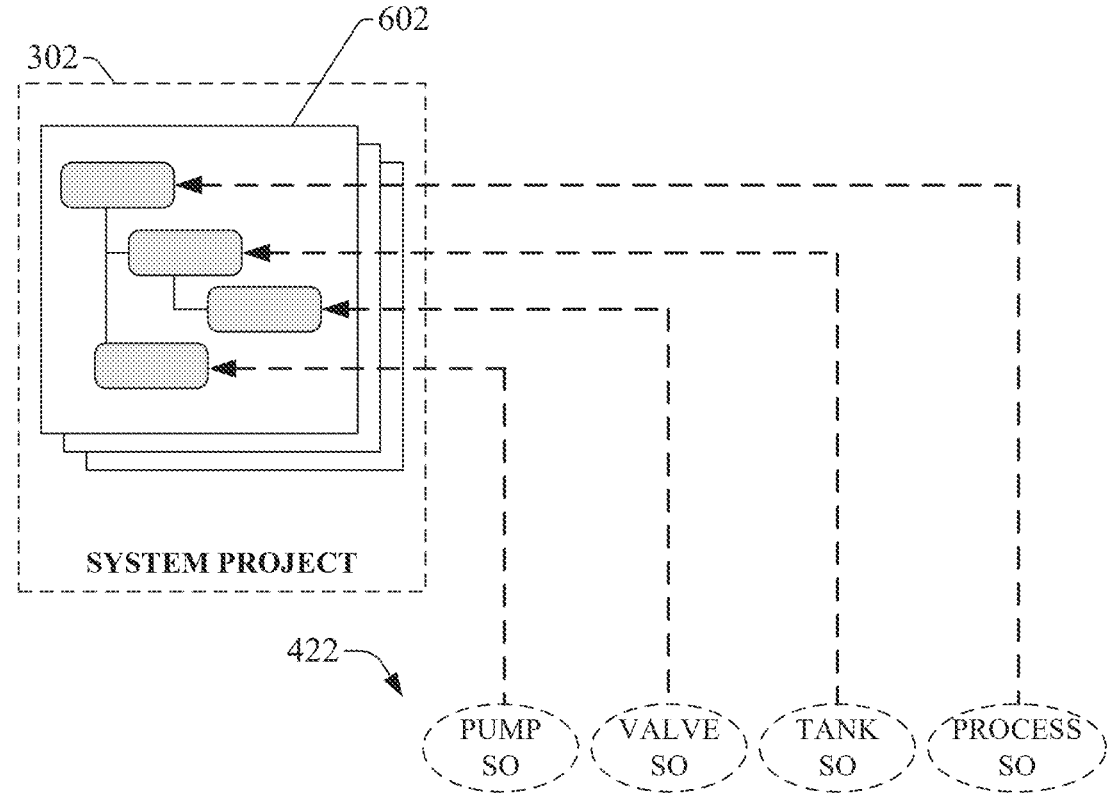
FIG. 6 is a diagram illustrating an example system project that incorporates smart objects into a project model.

As noted above, the system project 302 generated by IDE system 202 for a given automaton system being designed can be built upon an object-based architecture that uses smart objects 422 as building blocks. FIG. 6 is a diagram illustrating an example system project 302 that incorporates smart objects 422 into the project model. In this example, various smart objects 422 representing analogous industrial devices, systems, or assets of an automation system (e.g., a process, tanks, valves, pumps, etc.) have been incorporated into system project 302 as elements of a larger project data model 602. The project data model 602 also defines hierarchical relationships between these smart objects 422. According to an example relationship, a process automation object representing a batch process may be defined as a parent object to a number of child objects representing devices and equipment that carry out the process, such as tanks, pumps, and valves. Each smart object 422 has associated therewith object properties or attributes specific to its corresponding industrial asset (e.g., those discussed above in connection with FIG. 4), including executable control programming for controlling the asset (or for coordinating the actions of the asset with other industrial assets) and visualizations that can be used to render relevant information about the asset during runtime.

At least some of the attributes of each smart object 422 are default properties defined by the IDE system 202 based on encoded industry expertise pertaining to the asset represented by the objects. Other properties can be modified or added by the developer as needed (via design input 512) to customize the object 422 for the particular asset and/or industrial application for which the system projects 302 is being developed. This can include, for example, associating customized control code, HMI screens, AR presentations, or help files associated with selected smart objects 422. In this way, smart objects 422 can be created and augmented as needed during design for consumption or execution by target control devices during runtime.

Figure 7:
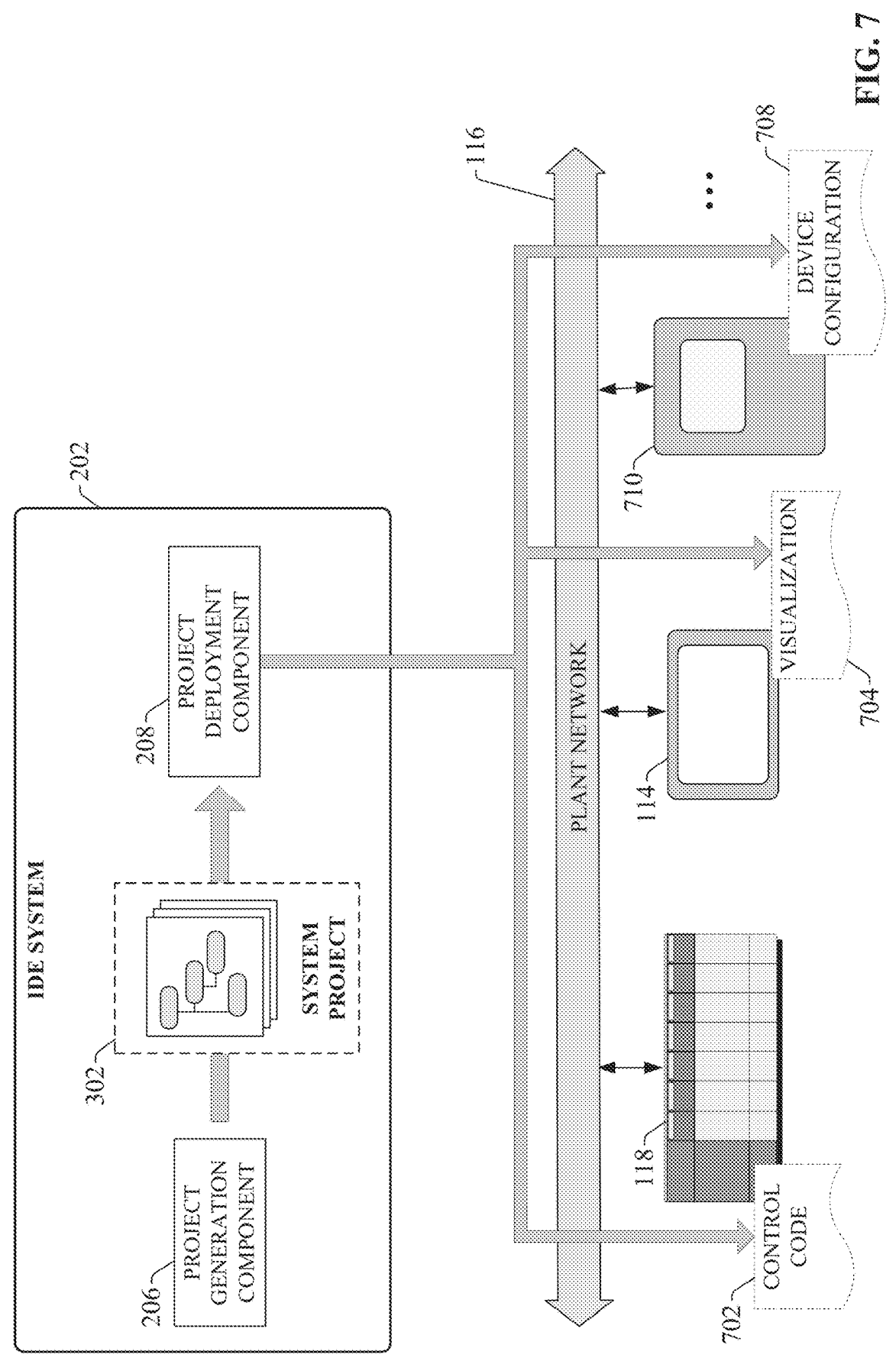
FIG. 7 is a diagram illustrating commissioning of a system project.

When a fully developed system project 302 for a given automation system has been completed, the system project 302 can be deployed to one or more target control devices for execution. FIG. 7 is a diagram illustrating commissioning of a system project 302. Project deployment component 208 can compile or otherwise translate a completed system project 302 into one or more executable files or configuration files that can be stored and executed on respective target industrial devices of the automation system (e.g., industrial controllers 118, HMI terminals 114 or other types of visualization systems, motor drives 710, telemetry devices, vision systems, safety relays, etc.).

For example, system project 302 may comprise one or more of control code, visualization screen definitions, motor drive parameter definitions, or other such control project elements. Upon completion of project development, a user can identify which target devices-including an industrial controller 118, an HMI terminal 114, and a motor drive 710—are to execute or receive these respective aspects of the system project 302. Project deployment component 208 can then translate controller code defined by the system project 302 to a control program file 702 formatted for execution on the specified industrial controller 118 and send this control program file 702 to the controller 118 (e.g., via plant network 116). Similarly, project deployment component 208 can translate the visualization definitions or motor drive parameter definitions to a visualization application 704 or a device configuration file 708, respectively, and deploy these files to their respective target devices for execution and/or device configuration.

Figure 8:
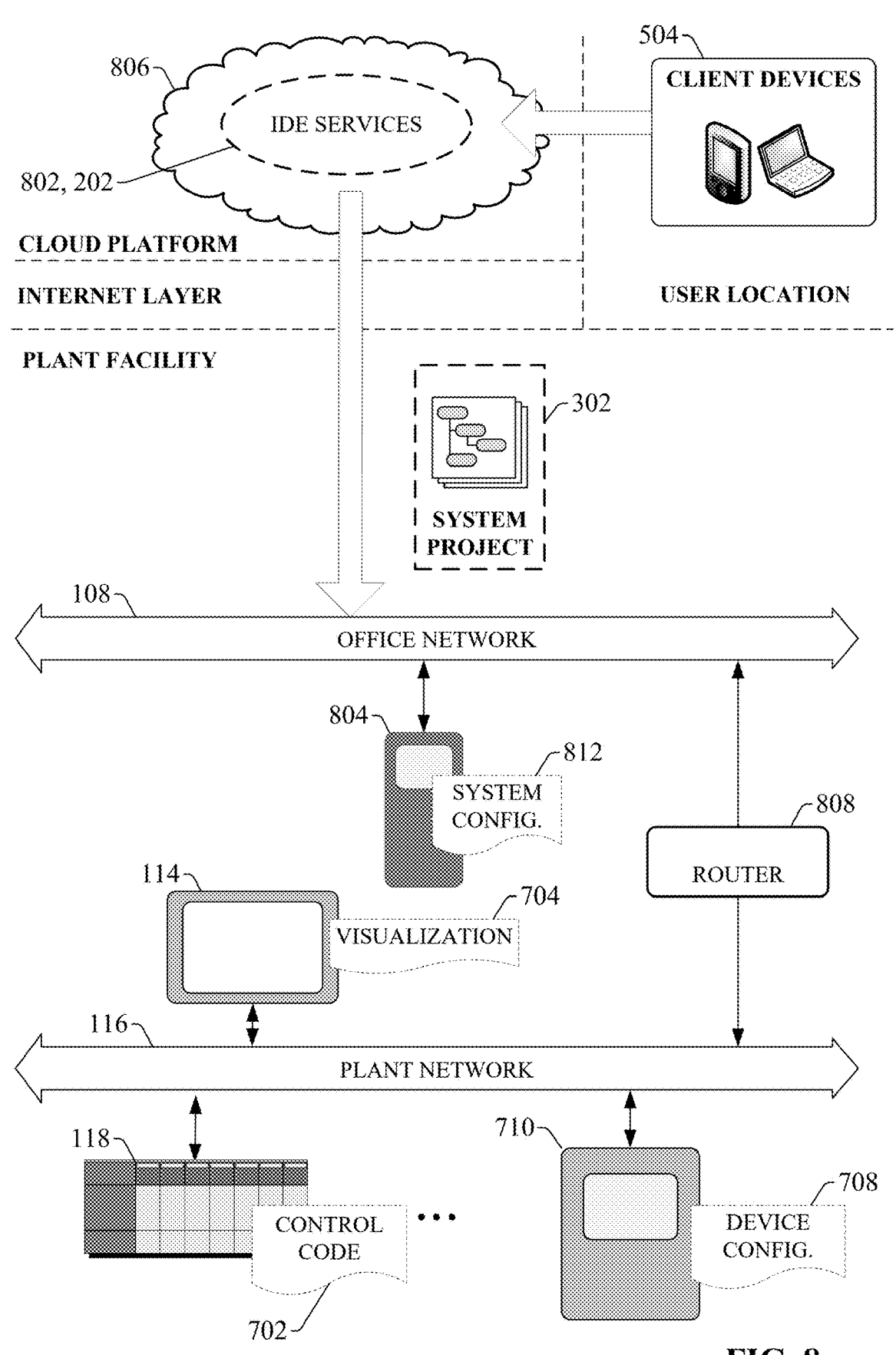
FIG. 8 is a diagram illustrating control programming using an industrial domain-specific language (DSL) and compilation of the DSL programming to yield executable industrial code.

As noted above, some embodiments of IDE system 202 can be embodied on a cloud platform. FIG. 8 is a diagram illustrating an example architecture in which cloud-based IDE services 802 are used to develop and deploy industrial applications to a plant environment. In this example, the industrial environment includes one or more industrial controllers 118, HMI terminals 114, motor drives 710, servers 804 running higher level applications (e.g., ERP, MES, etc.), and other such industrial assets. These industrial assets are connected to a plant network 116 (e.g., a common industrial protocol network, an Ethernet/IP network, etc.) that facilitates data exchange between industrial devices on the plant floor. Plant network 116 may be a wired or a wireless network. In the illustrated example, the high-level servers 804 reside on a separate office network 108 that is connected to the plant network 116 (e.g., through a router 808 or other network infrastructure device).

In this example, IDE system 202 resides on a cloud platform 806 and executes as a set of cloud-based IDE service 802 that are accessible to authorized remote client devices 504. Cloud platform 806 can be any infrastructure that allows shared computing services (such as IDE services 802) to be accessed and utilized by cloud-capable devices. Cloud platform 806 can be a public cloud accessible via the Internet by devices 504 having Internet connectivity and appropriate authorizations to utilize the IDE services 802. In some scenarios, cloud platform 806 can be provided by a cloud provider as a platform-as-a-service (PaaS), and the IDE services 802 can reside and execute on the cloud platform 806 as a cloud-based service. In some such configurations, access to the cloud platform 806 and associated IDE services 802 can be provided to customers as a subscription service by an owner of the IDE services 802. Alternatively, cloud platform 806 can be a private cloud operated internally by the industrial enterprise (the owner of the plant facility). An example private cloud platform can comprise a set of servers hosting the IDE services 802 and residing on a corporate network protected by a firewall.

Cloud-based implementations of IDE system 202 can facilitate collaborative development by multiple remote developers who are authorized to access the IDE services 802. When a system project 302 is ready for deployment, the project 302 can be commissioned to the plant facility via a secure connection between the office network 108 or the plant network 116 and the cloud platform 806. As discussed above, the industrial IDE services 802 can translate system project 302 to one or more appropriate executable files-control program files 702, visualization applications 704, device configuration files 708, system configuration files 812—and deploy these files to the appropriate devices in the plant facility to facilitate implementation of the automation project.

Figure 9:
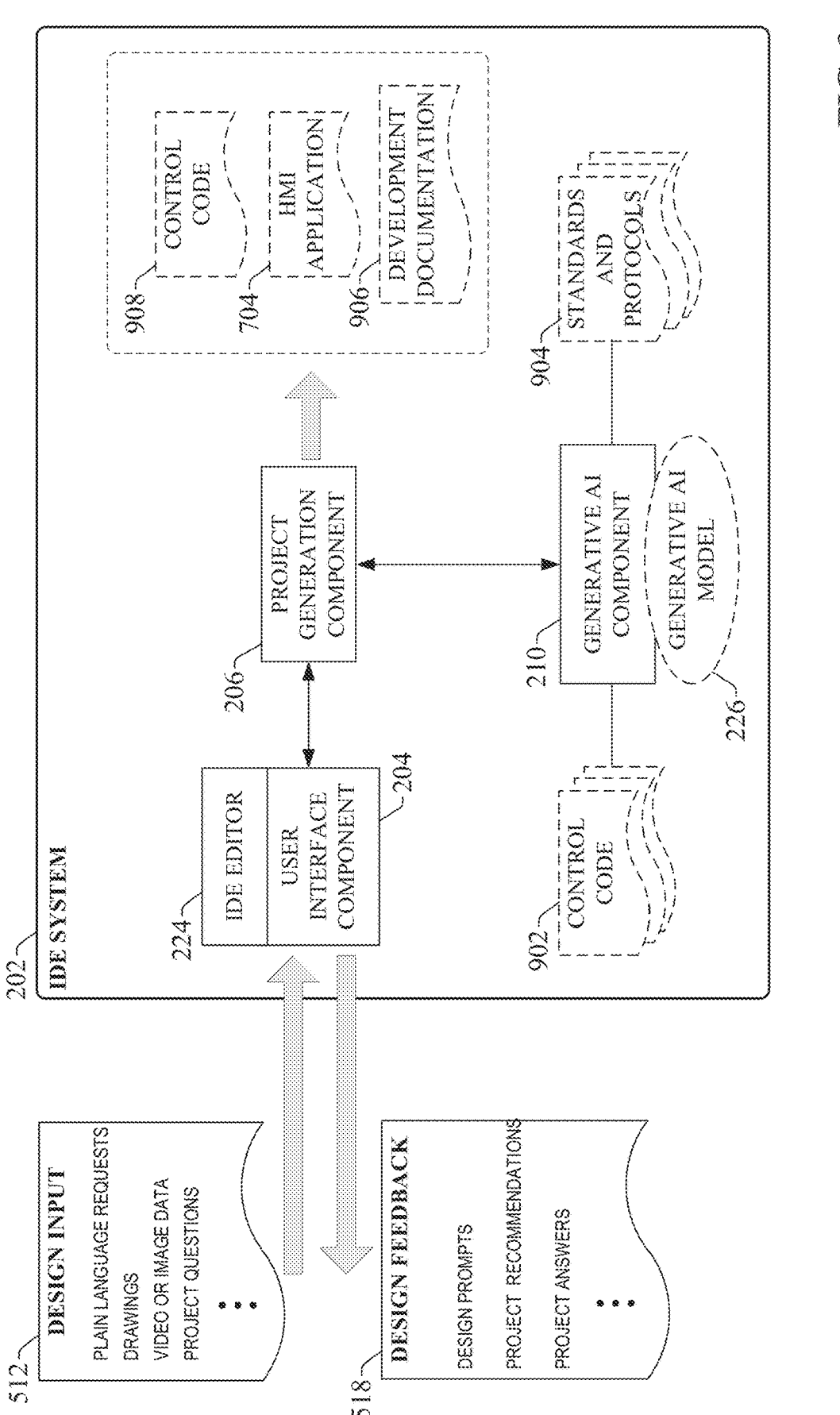
FIG. 9 is another diagram of the industrial IDE system illustrating example data flows associated with creation of industrial automation project components using generative AI techniques.

FIG. 9 is another diagram of the industrial IDE system 202 illustrating example data flows associated with creation of industrial automation project components using generative AI techniques according to one or more embodiments. As noted above, embodiments of the industrial IDE system 202 can support the use of generative AI techniques in connection with generating portions of a system project 302. To this end, the system 202 can include a generative AI component 210 that uses an associated generative AI model 226 to generate control code 908 for execution on industrial controllers 118 (packaged as a control program file 702), HMI screens for visualizing runtime information about an automation system, or other portions of a system project 302 based on functional specifications submitted to the system 202 as design input 512. Generative AI model 226 can be substantially any type of model, or set of models, encoding AI algorithms that can be trained using unsupervised or semi-supervised learning to generate new content relating to an industrial control project. The model can generate this content based on analysis of various types of design input 512 (including plain language functional descriptions), existing industrial control projects, known industrial control standards, or other such data. In various embodiments, the model 226 can be any of a diffusion model, a variational autoencoder (VAE), a generative adversarial network (GAN), a language-based generative model such as a large language model (LLM), a generative pre-trained transformer (GPT), or other such models. The model 226 can be trained for specific use in generating industrial control code 908 (e.g., ladder logic, sequential function charts, structured text, function block diagrams, industrial DSL, etc.), HMI applications 704 and their associated display screens and data links, I/O configuration data, development documentation 906 for an industrial control project being developed using the system 202, or other such digital design aspects of an industrial control system. The IDE system 202 can include an application programming interface (API) that interfaces the IDE editor 224 with the generative AI tools within the IDE system 202 itself.

In embodiments in which the IDE system 202 resides and executes on a cloud platform for use by multiple industrial customers, the generative AI model 226—or a set of generative AI models 226—can be trained in part using, as training data, system projects 302 developed by customers (including archived control code 902 for various industrial control projects), design input 512 submitted by the customers in connection with developing those system projects 302, knowledge of various types of industrial control applications and industrial standards and protocols (as defined by standards and protocol data 904 made accessible to the generative AI component 210), or other such training data.

To ensure that the system 202 generates system project software (e.g., control code 908, HMI applications 704, etc.) that accurately aligns with developers' design requirements and also complies with any applicable industrial standards (including prescribed safety and security standards), the generative AI model 226 can also be trained using industry-based libraries, "best practice" guidelines relevant to the industrial space, or known industrial standards and protocols. For example, training data used to train the generative AI model 226 can include pre-tested and verified control code 902 stored in a code library. This tested code 902 can encompass a range of code modules or segments suitable for monitoring and controlling various types of automation systems or carrying out different types of industrial applications (e.g., sheet metal stamping for manufacturing automotive components, lot traceability control, batch control applications for the food and drug industry, material handling applications, robot control applications, etc.). The control code 902 used to train the model 226 can be obtained from various sources, and can include pre-tested code samples generated and provided by an administrator of the IDE system 202 as well as validated control code 902 generated by users of the IDE system 202 and made available for anonymized training of the model 226. The generative AI component 210 can train the generative AI model 226 using this library of control code 902 to respond to user's plain language requests with suitably structured control code 908 that meets the technical requirements of the user's request.

In addition to using libraries of control code 902 to train the generative AI model 226, the model 226 can also be trained using standards and protocol data 904, which define various global industrial standards as well as customer-specific standards and protocols. These can include both globally applicable industrial standards, such as international standard IEC 61131-3 for programmable logic controllers, as well as standards that are specific to industrial verticals (e.g., food and drug, pharmaceuticals, etc.). The generative AI component 210 can use this training to tailor the design feedback 518 during project development to guide the designer toward alignment with applicable industry-wide and customer-specific programming and design standards. Training the model 226 using standards and protocol data 904 also allows the generative AI component 210 to answer questions the user may submit about the standards, or to tailor responses to specific design questions to guide the user toward compliance with standards and protocols that are known to have a bearing on the question.

The IDE system 202 can allow for customer-specific generative AI models 226 that are trained not only by data sets that are globally applicable to all industrial organizations or enterprises but also by customer-specific data sets applicable exclusively to each respective organization-such as in-house custom code or internal plant standards. To this end, the IDE system 202 can maintain separate customer-specific versions of the generative AI model 226, which are designated to respective customer organizations registered to use the IDE system 202. The user interface component 204 can instantiate a chat interface for each customer that allows that customer to engage with their own customized generative AI model 226, which has been trained using customer-specific training data (e.g., in-house control code 902 and standards) as well as any globally applicable training data. Each customer-specific version of the model 226 can be further trained in a customized manner based on interactions with users associated with the customer.

The IDE system 202 can leverage the trained generative AI models 226 to assist industrial control system designers in connection with developing and analyzing system projects 302, including industrial control code 908, HMI applications 704, device configuration settings, program and design documentation, or other aspects of an industrial control project. In an example scenario, the generative AI component 210 can assist a developer in generating control code 908 for an industrial control system based on design input 512 submitted by the developer. As an alternative to, or in addition to, submitting explicit control code to the system 202 in the control code's native programming format (e.g., ladder logic, structured text, function block diagrams, etc.), the user can submit, as design input 512, typed or spoken plain language requests to generate control code 908 for carrying out a specified industrial control function. To this end, the user interface component 204 can include a chat interface that allows the user to exchange chat-based communication with the IDE system (e.g., using ChatGPT). The user's initial plain language request may be relatively broad or specific, and the response generated by the generative AI component 210 will depend on the breadth of this initial design request. For example, if a user submits, as design input 512, a plain language request formatted as the statement "I need a control program for a web tension control system," the generative AI component 210 can submit this request to the generative AI model 226. The model 226 may require further information from the user to ascertain additional functional requirements and specifications of the web tension control system before control code 908 having a high probability of satisfying the user's requirements can be generated. Based on this determination, the generative AI model 226 can formulate a follow-up plain language prompt to be presented to the user via the chat interface, which is designed to glean at least a portion of the additional information required by the model 226. The content of the prompt can depend on the content of user's initial request, which defines a high-level category for the request (control code for a web tension control system) and also allows the model 226 to determine the set of further information that must be obtained from the user before accurate control code 908 can be generated.

Example types of information that the generative AI component 210 may prompt from the user—or which can otherwise be submitted by the user via the IDE system's chat interface as a plain language request—in connection with generating control code 908 can include, for example, the vendor and model of the industrial controller 118 on which the control code 908 will execute, a vendor and model of one or more machines being monitored and controlled, a desired performance metric or key performance indicator (KPI) (e.g., desired product throughput to be achieved by the automation system to be controlled, a desired maximum energy consumption by the automation system, a desired minimum motor speed, etc.), specifics of the type of product or material to be manufactured by the automation system, or other such information. The system's chat interface can also allow the user to specify, as part of the plain language request, a programming language or format in which the control code 908 should be written (e.g., ladder logic, structured text, functional block diagram, etc.). The prompts generated by the generative AI component 210 and presented to the user by the user interface component 204 (as part of design feedback 518) can be formatted as plain language questions asking the user for the required information.

When sufficient information has been obtained from the user-either as proactive requests from the user or via suitable plain language prompts—the generative AI component 210 can provide the project generation component 206 with control code design parameters inferred by the generative AI model 226 based on the user's query and responses. These control code design parameters are selected to ensure that the resulting control code 908 will satisfy the explicit and inferred design requirements, as obtained via generative AI analysis of the user's inputs and responses. The project generation component 206 can then use these design parameters to generate control code 908 satisfying the user's design requirements. The control code 908 can be output as an executable file that can be installed on an industrial controller 118 for execution, where execution of the file causes the controller 118, during runtime operation, to monitor and control the automation system in accordance with the control code 908. In addition to the control code 908, which process input data from the automation system's input devices and send control signals to the automation system's output devices, the executable file can also define the tag database for storing data values generated by the control code 908, as well as I/O module configuration data for configuring the controller's I/O modules to function in conjunction with the control code 908.

In some embodiments, rather than prompting the user for all pieces of information required to produce final version of the generated control code 908, the generative AI model 226 can infer, based on the type of industrial application being designed (as determined from the user's plain language request), variables that are likely to impact the final version of the control code 908, such as ranges of possible desired values of KPIs, variations in the types of products or materials to be produced, variations in the hardware platforms on which the control code 908 will execute, or other such variables. As an alternative to prompting for specific values of these parameters, the generative AI component 210 and project generation component 206 can generate alternative versions of the control code 908 that accommodate ranges of these variables and present these alternatives to the user for selection. The user interface component 204 can render a note with each alternative version of the control code 908 indicating the scenario for which that version of the control code 908 is appropriate (e.g., the most energy efficient control cycles, the highest product throughput, the least likely to result in machine downtime, etc.). The user can then select one of the offered code versions for export as a finalized system project.

The generative AI component 210 (using generative AI model 226) and the project generation component 206 can generate other types of industrial control project content using a similar approach, including but not limited HMI applications 704 that can be installed and executed on HMI terminals to visualize the industrial process carried out by the automation system. In some scenarios, the generative AI model 226 can, in conjunction with generation of the control code 908 as described above, infer suitable interactive HMI display screen designs for visualizing the industrial process to be controlled by the control code 908, and the generative AI component 210 can provide this information to the project generation component 206, which uses the information to generate an HMI application 704 designed to render and execute the display screens. As part of this process, the generative AI model 226 can select a set of animated visualization objects and data items to be rendered on each display screen, design the layout of these objects on the respective screens, configure the data linkages between each visualization object and the data item (e.g., a controller data tag defined by the control code 908) that drives the state of the object, and configure navigation paths between the display screens.

In other scenarios, the generative AI component 210 can generate an HMI application 704 in accordance with a user request independently of control code creation (e.g., for an automation system for which the control code has already been developed, but which requires an HMI to visualize information about the automation system's operation). In an example scenario, the user may request, via a plain language request submitted via the user interface component's chat interface, an HMI for a specific type of industrial application, such as a die-cast system that produces engine blocks for a specific model of vehicle. The generative AI model 226 can leverage its industry-specific training to generate a set of HMI screens suitable for visualizing data from the indicated industrial process.

The industrial IDE system 202 can also use generative AI to assist the user in selecting, configuring, or bulk configuring, industrial devices to be deployed as part of one or more automation systems. In an example scenario, the user can submit, via the system's chat interface as a plain language request, a request for a recommended configuration for an industrial device (e.g., a motor drive, a special function module of an industrial controller, etc.) to be used within a specified type of industrial application. The generative AI component 210 can process this request using generative AI model 226, and render a response offering guidance on configuring the device. This can include recommended settings for the device's configurable software parameters (e.g., scale factors, maximum or minimum speeds, dwell times, operating mode settings, etc.) as well as recommendations for any hardware-based device settings. This guidance may be based on learned configurations of the device that are commonly applied when the device is used for the specified type of industrial application. The generative AI component 210 can also tailor the content of the device configuration recommendations to align with relevant industrial or in-house standards and protocols, as determined based on analysis by the trained generative AI model 226. The user may select to accept the recommended device configurations and integrate the corresponding device configuration data into a system project 302 being developed for the automation system.

The generative AI component 210 can also use the model 226 to offer device sizing and selection guidance to the user while developing a system project 302. In this regard, the generative AI model 226 can act as an AI-based rules engine that provides guidance to the user regarding industrial devices, and specific device models, that are determined to be a best fit for the industrial application currently being developed, as well as suitable device configurations for those devices. In some embodiments, the generative AI component 210 can generate proactive device recommendations by analyzing, using the generative AI model 226, portions of the system project 302 currently being developed by the user using the IDE system's design tools. Based on this generative AI analysis, the model 226 can infer industrial device types suitable for implementing the automation system being designed (e.g., motor drives such as variable frequency drives, safety relays, industrial robots, etc.), product numbers of specific devices of those types that have appropriate functional capacities for carrying out the control functions being designed (e.g., processing speed, memory, operating speed, I/O capacity, reaction times, etc.), and device configuration settings for configuring the devices to carry out the industrial application.

In general, the industrial IDE system 202 can use the techniques described above to support goal-based automation programming and design, generating a comprehensive set of device specifications and configurations, control programming, and visualization screens for an automation system based on functional specifications and goals submitted as plain language chat inputs. In an example scenario, a user may specify, via a plain language input submitted via the IDE system's chat interface, production goals for an automation system being designed (e.g., specifying that a bottling plant being designed must be capable of producing at least 5000 bottles per second during normal operation)

and any other relevant design constraints applied to the design project (e.g., budget limitations, available floor space, available control cabinet space, etc.). Based on this information, the generative AI component 210 will generate portions of the system project 302 to satisfy the specified design goals and constraints. Portions of the system project 302 that can be generated in this manner can include, but are not limited to, device and equipment selections (e.g., definitions of how many pumps, controllers, stations, conveyors, drives, or other assets will be needed to satisfy the specified goal), associated device configurations (e.g., tuning parameters, network settings, drive parameters, etc.), control code 70, and an HMI application 704 defining HMI screens suitable for visualizing the automation system being designed.

In some scenarios, rather than generating a finalized industrial system project satisfying a designer's request—e.g., fully developed control code 908 or a fully developed HMI project 704—the generative AI component 210 and project generation component 206 can generate an initial, non-finalized version of a requested system project based on the user's initial request as well as the user's responses to any subsequent prompts for further information from the system 202. This initial version of the project can provide a framework suitable for the type of industrial application requested by the user, with some elements of the project left generic or incomplete for manual customization by designer. For example, in response to a designer's request for an HMI application for visualizing a specified type of industrial application, the generative AI model 226 can generate an incomplete HMI application 704 comprising display screens and associated visualization elements capable of visualizing the application, but leaving some or all of the data tag linkages for the visualization objects generic or undefined to allow the user to manually define the linkages to data tags that will be used to drive the visual states of those objects.

In some embodiments, the generative AI component 210 can also assist in locating a publicly available control code sample capable of solving a design problem or carrying out a control function specified by a user's plain language request. In an example scenario, a designer may be using the IDE system 202 to develop a system project 302 and realizes a need for control code for performing a certain control action to be included in the project 302 (e.g., control of a feed conveyor or exit conveyor, control of a pick-and-place machine, etc.). The designer can submit, via the chat interface of the user interface component 204, a request for control code that solves the problem. The request can be formulated as plain language question, such as "Is there ladder logic for controlling an exit conveyer for a die cast machine?" In response the generative AI component 210 can translate the request using model 226, identify and retrieve sample code from the library of control code 902 capable of solving the user's problem, and present this code via the development interface to allow the user to integrate this code into the system project 302 if desired. In cases in which precise code that aligns with the designer's problem is not available, the generative AI model 226 can generate new code 908 that solves the designer's problem by intelligently adapting existing code 902 from the library, bringing the code into alignment with the designer's needs, or by otherwise generating new code 908 determined to solve the designer's problem. In some cases, the search for suitable control code that aligns with the designer's request can be limited to a library of control code or system projects 302 that have been developed internally within the developer's organization and are currently in use within plant facilities of the organization. This approach can facilitate coding consistency and standardization within the developer's organization.

Each customer-specific version of the generative AI model 226 can be further trained automatically over time based on observations of the customer's typical design approaches for commonly programmed functions (e.g., pumping applications, batch processes, palletizing operations, etc.). To this end, some embodiments of generative AI component 210 can be configured to monitor design input 512 over time and, based on this monitoring, learn correlations between certain design actions (e.g., addition of certain code modules or snippets to design projects, selection of certain visualizations, etc.) and types of industrial assets, industrial sequences, or industrial processes being designed. The generative AI component 210 can refine the generative AI model's training using these learned correlations, which can subsequently be used to automatically generate control code 908 or render recommendations during subsequent project development sessions. For example, if generative AI model 226 determines, based on analysis of design input 512 received during a design session, that a designer is currently developing a control project involving a type of industrial equipment that has been programmed and/or visualized in the past in a repeated, predictable manner, the generative AI component 210 can instruct user interface component 204 to render recommended development steps or control code 908 the designer may wish to incorporate into the system project 302 based on how this equipment was configured and/or programmed in the past.

Chat input submitted via the user interface component 204 can also be used to ask functional questions about the program instructions available in the IDE system's instruction set or library. This can mitigate the need for the designer to be familiar with the available instruction set in order to generate control code for solving specific design problems. The chat interface of the user interface component 204 can also allow the user to ask questions about a specific instruction in the instruction set, and the generative AI component 210 can generate and render the response based on explicit or inferred knowledge about the instruction. For example, the user may submit a query having a general plain language format "Can I use this instruction to solve [x] problem?" where x is a specific design problem that the designer is considering addressing using the named instruction. In response, the generative AI component 210 can use the model 226 to translate the question and determine the information being requested by the user, leverage knowledge of the instruction set to determine whether the instruction can be used to solve the indicated problem, and render the answer to the user via the user interface component 204. In some such cases, the generative AI model 226 can determine whether the instruction can be used to solve the designer's problem based on sets of control code 902 that were used as training data for the model 226; e.g., by inferring whether the instruction has been used in any of the control code 902 to solve similar design problems.

The use of generative AI to assist a developer in developing control code 908 or other aspects of an industrial control project can abstract the developer from the details of the control programming language itself, facilitating a higher-level approach to code creation that allows the developer to express the functional requirements for an industrial control system in a natural, plain language manner, with the generative AI model 226—trained with industry-specific sets of training data an industrial knowledge-creating control code 908 that aligns with the requirements. This approach can also mitigate the need for developers to manually define detailed device configurations or specify data tags for the control code 908, instead allowing the generative AI model 226 to infer and set specific device or tag configurations based on inferences of the user's functional requirements and the industry-specific training of the model 226. By relying on the generative AI model 226 to generate some or all of the control code 908 or other aspects of a system project, the system 202 allows the developer to focus more exclusively on the desired functional and performance results of the control design—e.g., in terms of speed, cost, efficiency, etc.—and letting those results drive automated generation of suitable control code 908.

Although examples described consider scenarios in which the generative AI component 210 and its associated model 226 generate control code 908 and other components of a system project 302 by processing plain language user requests, some embodiments of the generative AI component 210 can also apply generative AI to other types of design input, and generate system project software based on this input. For example, the generative AI component 210 can apply generative AI to engineering drawings representing the automation system for which control code 908 is being designed (e.g., electrical drawings, I/O drawings, mechanical drawings, P&ID drawings, etc.), infer functional specifications or design goals that dictate the design of a control program for monitoring and controlling the represented system, and generate control code 908 (including any data tag and I/O definitions) aligning with these functional specifications.

In addition to generation of executable control software for an automation system, such as control code 908 and HMI applications 704, the IDE system 202 can also leverage generative AI to automatically generate development documentation 906 for the resulting control system project. This can include in-software documentation such as in-line programming comments (e.g., comments or descriptors assigned to ladder logic rungs or other program elements of control code 908) as well as separate digital documentation 906 used for auditing, safety, or design documentation purposes. In the case of control code comments, the generative AI model 226 can, in parallel with generation of control code 908 as described above, generate and embed plain language comments into the code 908. The generative AI component 310 can assign these comments to selected lines or sections of the code 908 (e.g., ladder logic rungs, blocks of structured text, etc.), such that each comment provides a human-readable description summarizing the functionality of its corresponding line or section of code. The generative AI component 210 can also generate and assign labels to individual elements of a program—e.g., an output coil or input contacts of a rung of ladder logic, a data register used by the program to store a particular telemetry value, etc.—to identify the measured value or component represented by that element (e.g., Pipeline 6 Flow Rate, Die Cast #7 temperature, Part Pusher Extended, etc.). These comments, produced by the generative AI model 226, can assist programmers, testers, and field engineers in interpreting the code 908.

The generative AI component 210 can also use the generative AI model 226 to generate development documentation 906 for a finalized control system project 302 or its associated control code 908, HMI applications 704, or other aspects of the control system design. In some embodiments, this can include safety documentation that may be required for compliance with industrial safety standards. In this regard, the generative AI model 226 can be trained using prescribed industrial safety standards (as part of the standards and protocol data 904), and can use this training to automatically generate safety documentation for the control system that supports system validation requirements. For example, the model 226 can identify characteristics of the control code 908 and its corresponding automation system that are relevant to safety validation requirements, such as the industrial vertical for which the control code 908 was developed, the type of industrial application to be carried out by the control code 908, individual control functions performed by the control code 908, industrial devices or systems that make up the automation system to be monitored and controlled by the control code 908, or other such characteristics. Based on this information and trained knowledge of safety validation requirements for commissioning control systems having the determined characteristics, the generative AI component 210 can use the generative AI model 226 to generate safety validation documents defining tests that should be performed on the commissioned automation system before it can be put into service. The generative AI component 210 can also generate other types of development documentation 906 for the completed automation system that can be used for auditing purposes, including code development documentation.

The IDE system 202 can also leverage generative AI to assist with early phases of the control system design, prior to creation of control code 908. This can include, for example, using the generative AI model 226 to generate engineering drawings for an automation system being designed (e.g., electrical drawings, I/O drawings, mechanical drawings, etc.) based on functional requirements submitted by the user via chat-based plain language requests.

Figure 10:
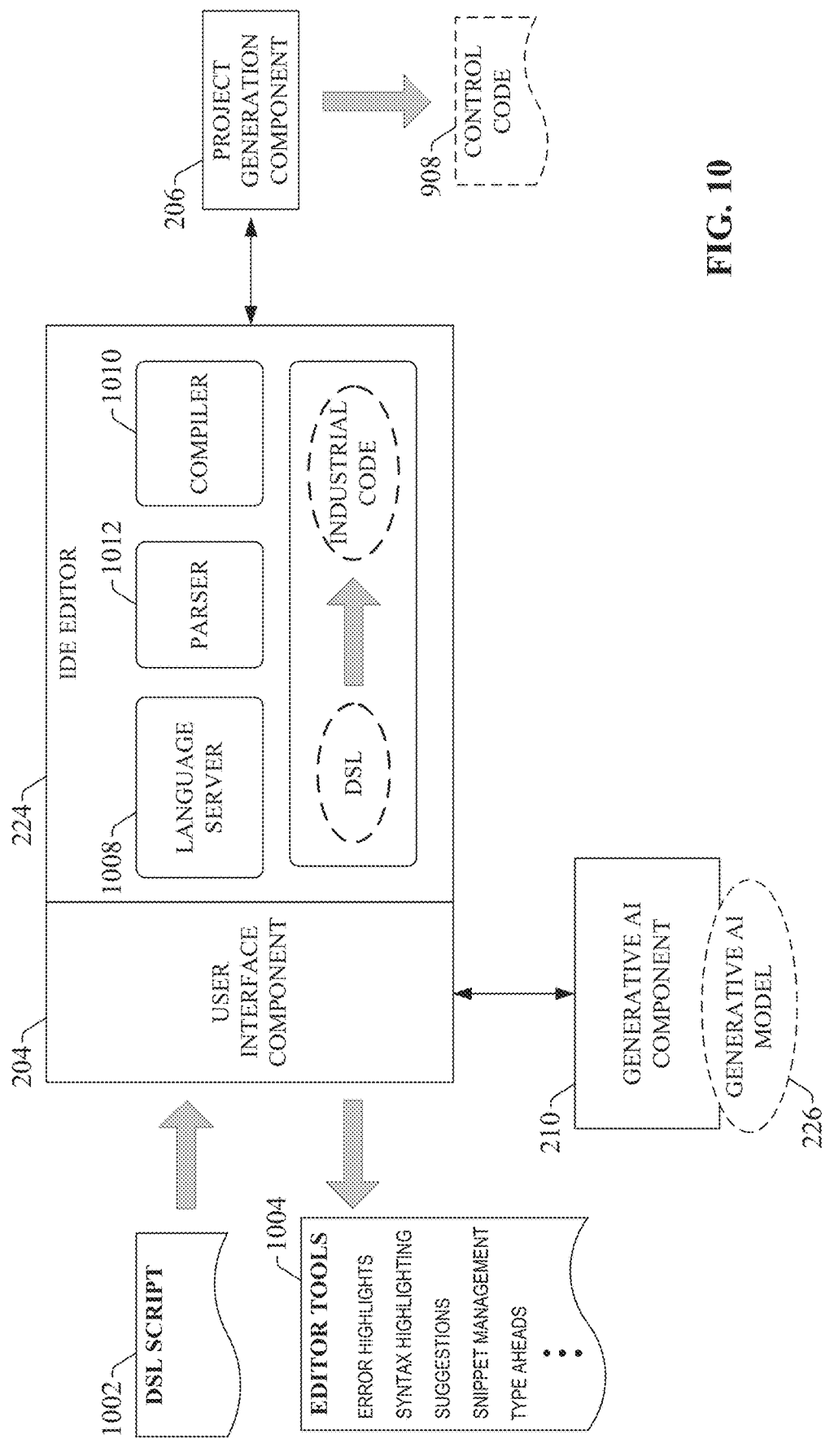
FIG. 10 is a diagram illustrating control programming using an industrial DSL and compilation of the DSL programming to yield executable industrial control code.

In addition or as an alternative to supporting graphical-based control code formats such as ladder logic, some embodiments of the industrial DSL system 202 can support development of industrial control code 908 using a scripted, text-based syntax. In some such embodiments, the scripted language may be a domain-specific language (DSL) customized for industrial control programming, and the generative AI model 226 can be trained on this DSL. FIG. 10 is a diagram illustrating control programming using an industrial DSL and compilation of the DSL programming to yield executable industrial control code 908. According to these embodiments, the IDE editor 224 can render a DSL programming interface for entry of industrial DSL script 1002. The IDE editor 224 can also support associated editor tools 1004 that provide dynamic assistance during programming. Writing control code using a text-based DSL syntax-allowing programming objects to be described through text—can sometimes be preferable to programming with ladder logic or other graphical programming platforms typically used to program automation systems, since experienced programmers can generate code more quickly using text-based programming syntax and associated editor tools 1004 that require fewer mouse clicks. Editor tools 1004 supported by the IDE editor 224 can include, but are not limited to, error highlighting, syntax highlighting, code snippet management, type-ahead or autocomplete functionality, intelligent programming suggestions, and other such tools. Some or all of these programming services can be provided by a language server 1008 associated with the IDE editor 224.

In addition to intrinsic data types such as integers, double integers, Boolean, floating point, etc., IDE editor 224 can also support definition of data types specific to industrial automation applications, including but not limited to screens (representing HMI screens), add-on graphics, automation objects, devices (e.g., automation devices such as controllers, drives, telemetry devices, etc.), projects, models, applications (e.g., applications that can be deployed to a device for execution, such as control logic, analytics applications, power monitoring applications, etc.), programs, parameter connections, tasks, tags (e.g., controller tags), or other such data types. The IDE editor 224 allows instances of these types to be created for inclusion in a system project 302. Instances of each type may have certain properties or members that are a function of the type.

The industrial DSL supported by the IDE editor 224 can provide programmatic guardrails based on known relationships between industrial entities represented by automation objects (e.g., controllers, tags, HMIs, motor drives, tanks, valves, etc.), and editor tools 1004 can guide the project development workflow based on these known relationships. This can include, for example, identifying when a parent smart object 422 (e.g., a tank automation object) has been invoked within the DSL program and rendering possible child smart objects 422 (e.g., valves, pumps, etc.) associated with the parent object that the user may wish to reference.

IDE editor 224 can allow a user to program any aspects of a system project 302 using a customizable industrial DSL script 1002. The DSL editor's parser 1012 can then parse this DSL script 1002 to yield a hierarchical model (e.g., an abstract syntax tree or another model format) of the program. The DSL editor's compiler 1010 can then translate this hierarchical model to industrial code 908 (including any smart objects 422 defined by the DSL script 1002) that is understandable and executable by an industrial control device (e.g., a programmable logic controller or another type of industrial control device). The resulting control code 908 can then be added to system project 302 or deployed directly to the target controller 118. In general, the IDE editor 224 can map the industrial DSL to a structured language understandable by the target industrial control equipment.

The generative AI model 226 can be trained in the syntax of the industrial DSL so that the generative AI component 210 (together with the project generation component 206) can generate control code 908 using the techniques described above, but formatted in the industrial DSL supported by the editor 224. For example, the user can submit plain language requests via the user interface component's chat interface conveying the type of control solution required, as described above. The generative AI model 226 will, if necessary, prompt the user for any additional specifics required to allow the generative AI model 226 to generate control code 908 that addresses the user's indicated design requirements. The generative AI component 210 can use the industrial DSL training of the model 226 to generate the code 908 formatted as the industrial DSL supported by the IDE system 202. In some embodiments, the generative AI component 210 can generate the control code 908 in accordance with user's explicit request to format the requested control code 908 as the industrial DSL (or another control programming format).

Figure 11:
FIG. 11 is a diagram illustrating submission of control code to the industrial IDE system for generative AI-assisted analysis.

In addition to providing a development platform that assists developers in creating new control code 908 or other aspects of an industrial system project 302 using generative AI, some embodiments of the industrial IDE system 202 can also allow users to submit control code 1102 that was developed or edited using another platform (or that was previous developed using the IDE system 202) for generative AI-assisted analysis, recommendations, or insights into the code. FIG. 11 is a diagram illustrating submission of control code 1102 to the industrial IDE system 202 for generative AI-assisted analysis. The generative AI component 210 can use the trained model 226 to analyze the submitted control code 1102 and provide various types of troubleshooting assistance output 1104 via the system's development interface.

In an example scenario, the generative AI component 210 can apply the trained model 226 to the submitted code 1102 to provide level 1 troubleshooting assistance, identifying errors in the code 1102 and rendering chat-based recommendations for addressing the errors or automatically modifying the code 1102 to correct the errors. The generative AI model 226 can learn to identify and correct industrial control code errors based on the sets of training data used to train the model, including the library of control code 902, which can train the model 226 to recognize control coding patterns applicable to specific types of industrial control applications, system types, control hardware platforms, and industrial verticals. The generative AI model 226 can also leverage its training with industrial standards and protocols (using standards and protocol data 904 as training data) to determine whether the submitted code 1102 aligns with industrial or safety standards or security protocols that are applicable to the industrial vertical or type of industrial application for which the control code 1102 was designed. If the code 1102 is found to deviate from an industrial or safety standard that is applicable to the code 1102, the generative AI component can render, via the chat interface, a plain language recommendation proposing a modification that to the code 1102 that will bring the code 1102 into alignment with the standards. Example modifications that may be proposed by the generative AI component 210 can include, for example, modifying or enhancing control programming for an industrial asset in a manner that improves the safety of the asset's operation or that aligns with a prescribed coding standard for the asset's type, changing the name of a program variable to align with a data tag naming standard, re-ordering or otherwise modifying a control sequence defined by the control code 1102, or other such modifications. The model 226 can also be trained using data from appropriate vendor-specific knowledgebases or customer-specific standard operating procedure (SOP) data, and use this training to perform troubleshooting on the submitted code 1102 and prescribe modifications that will address problems or issues discovered in the code 1102.

In some embodiments, after submission of control code 1102 for generative AI analysis, the system 202 can allow the user to submit, via the chat interface of the user interface component 204, specific questions about the code 1102 for which the user requires answers. In response to such queries, the generative AI component 210 can interpret the user's query, and apply generative AI analysis to the code 1102 using the trained model 226 to ascertain a suitable answer. Example queries about the control code 1102 can include, for example, questions as to whether the code 1102 has the ability to perform a specific function or satisfy a specified performance metric (e.g., "Will this code achieve product throughput in excess of 1000 units per week?", "Will this code reduce energy consumption of my automation system?", etc.), questions regarding hardware compatibility or requirements for the code 1102 (e.g., "What I/O modules do I need to execute this code?", "Is this code executable on an SLC-500 PLC?", etc.), questions as to whether the code 1102 complies with a specified industrial standard, or other such queries. The generative AI component 210 can provide answers to these questions as plain text chat responses rendered in the development interface of the IDE system 202.

In a related aspect, the generative AI component 210 can analyze submitted control code 1102 using model 226 to identify potential improvements that can be made to the code 1102, and render proactive chat-based recommendations for modifications to the code 1102 to realize the improvements. These can include, for examples, modifications that will reduce the amount of code without substantively altering the code's intended functionality; modifications that will improve one or more performance metrics of the automation system to be controlled by the code 1102 (e.g., speed, energy consumption, machine uptime, product throughput, cycle time, etc.), or otherwise cause a performance metric to satisfy a criterion indicative of improved performance; modifications that reduce the number of data tags consumed by the code 1102; or other such modifications. In some cases, the system 202 can allow the user to respond to the initial recommendation with one or more follow-up questions about the modification or its impacts on system performance, if the use desires additional information prior to accepting the proposed modifications (e.g., "Will this modification increase energy consumption?", "How much will product output increase if this modification is implemented?", etc.). The generative AI component 210 can respond to these queries with the requested information, as determined based on further analysis by the generative AI model 226. Once satisfied, the user can indicate acceptance of the recommended modifications, which can then be integrated into the code 1102.

The generative AI component 210 can also analyze submitted control code 1102 in view of the industrial standards and protocols with which the generative AI model 226 has been trained, to determine whether the code 1102 aligns to all industrial standards applicable to the industrial application or vertical for which the code 1102 is designed (including both global standards as well as any in-house design protocols dictated by the industrial organization that will be using the code 1102). Based on this analysis, the generative AI component 210 can render a notification identifying any deviations from an applicable industrial standard or protocols. If deviations from relevant safety standards (or other types of industrial standards) are found, the user interface component 204 can render recommendations or other types of feedback for bringing the code 1102 into compliance with the internal or external standards. This feedback can take the form of text-based recommendations (e.g., recommendations to rewrite an indicated portion of the code 1102 to comply with a defined programming standard), syntax highlighting, error highlighting, auto-completion of code snippets, or other such formats.

In another example, the IDE system 202 can use generative AI to reverse engineer unfamiliar control code 1102 to assist in debugging or re-designing the code 1102. This can be useful, for example, in scenarios in which a systems integrator has been hired to correct a control problem for an industrial customer and is unfamiliar with the control code 1102 that requires modification. In such cases, the IDE system 202 can use generative AI to assist the systems integrator in locating the section of code that requires modification. For example, the generative AI component 210 can translate and process a plain language query from the user requesting the location of the code segment or routine that is to be modified, or that otherwise needs to be examined in order to understand the code 1102 (e.g., "Where is the code that controls stamping press #5?"). In response to this question, the generative AI component 210 can use the model 226 to analyze the code 1102, and identify and navigate to the requested code segment within the IDE system's development interface. The IDE system 202 can also answer specific questions about the control code's functionality, structure, variables, or other properties.

In the case of control code 1102 that has already been deployed to an automation system and is in runtime operation, the generative AI model 226 can analyze the code 1102 in view of a specific runtime performance question submitted by the user. For example, a user may submit a plain language query via the system's chat engine asking about a specific problem observed on the automation system being monitored and controlled by the control code 1102. As an example query, the user may ask the system 202 "Why is X happening in my system?" where X is an observed performance issue such as an increase in machine downtime, a decrease in quality of the parts produced by the automation system, a degradation of a specified performance metric, or other such concerns. In response to this query, the generative AI component 210 can analyze the code 1102 to discover potential programmatic causes for the indicated concern and render troubleshooting assistance or guidance suggesting steps for addressing the issue. In some embodiments in which the IDE system 202 is permitted access to the time-series runtime telemetry data generated by the automation system (that is, data generated by telemetry devices or other analog and digital input devices that make up the automation system), the generative AI model 226 can incorporate this data into the analysis to better diagnose the issue and provide more refined feedback. Users' queries regarding observed runtime issues can also be comparative in nature—e.g., "Why is my overall equipment effectiveness lower on Line 1 during first shift versus second shift?"—and the generative AI component 210 can perform its analysis of the code 1102 and any relevant runtime data based on these user-defined analytic parameters and goals. In some embodiments, the IDE system 202 may maintain separate generative AI models 226 for design assistance and runtime operations assistance, where each model 226 is trained to address the types of problems that arise in those two lifecycle domains.

Some embodiments of the ID system 202 can support a testing framework for automation that verifies operation of all aspects of a system project 302 (e.g., control code 908, HMI applications 704, etc.). As part of this testing framework, the IDE system's project testing component 212 can execute test scripts designed to execute one or more test scenarios against the control code. These test scripts can be associated with, and directed to, specific portions of the system project 302 against which the test scenarios are to be applied. In some cases, test scripts can be applied to the system project 302 as a whole in a holistic manner, rather than to specific portions of a control program, verifying linkages across design platforms (e.g., control code, visualization, panel layouts, wiring, piping, etc.) that may otherwise not be tested.

Figure 12:
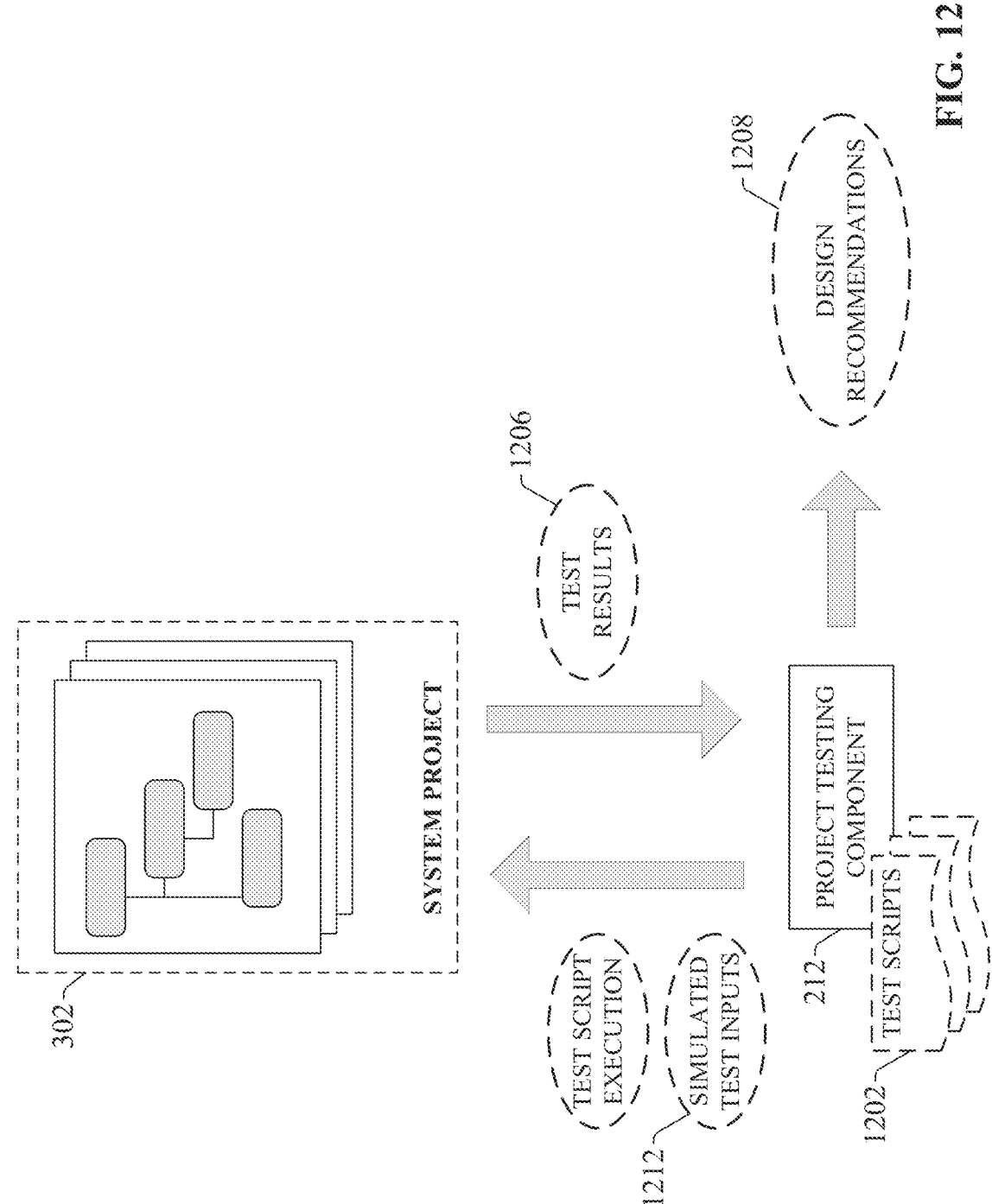
FIG. 12 is a diagram illustrating testing of an example system project by the IDE system's project testing component.

FIG. 12 is a diagram illustrating testing of an example system project 302 by the IDE system's project testing component 212. The project testing component 212 can be configured to execute test scripts 1202 designed to test and debug aspects of an automation system project 302, including control code 908 as a whole; individual routines, lines, or code segments of the control code 908, specific instances of smart objects 422 included in the control code 908, HMI applications 704, or other developed software components of a control system project. Each test script 1202 can define one or more test scenarios that may beneficially be run against a specific portion of the system project 302 (e.g., a line or section of control code 908, a smart object 422 or groups of inter-related smart objects 442, etc.). In some cases, the test scenarios encoded into the tests scripts 1202 can be designed based on industrial expertise regarding the control functions or industrial applications represented by the targeted portions of the system project 302.

During or after development of a system project 302, the IDE system's project testing component 212 can execute test scripts 1202 against respective portions of the system project 302 as needed to verify proper or expected responses of the system project 302, thereby validating the project 302. To this end, each test script 1202 can define simulated test inputs 1212 to be provided to the portion of the system project 302 (e.g., a targeted section of control code 908, a smart object 422 or set of related smart objects 422, an HMI visualization, etc.) that the test script 1202 was designed to validate. The test script 1202 can also define expected responses of the targeted portion of the project 302 to the simulated inputs 912 generated by the script 1202.

According to an example testing procedure, project testing component 212 can execute one or more test scripts 1202 associated with respective one or more portions or elements of control code 908. Execution of the test scripts 1202 can involve, for example, feeding simulated test inputs 1212 to the control code 908 or other elements of system project 302 according to a sequence defined by the test scripts 1212, setting values of digital or analog program variables defined by the system project 302 according to a defined sequence, initiating control routines of control code 908 according to a defined sequence, testing animation objects or other visualization elements defined by an HMI application 704, verifying data linkages between control routines, verifying relationships between program elements and drawing elements, confirming that device configuration settings or parameter values are appropriate for a given industrial application being carried out by the system project 302, or otherwise interacting with system project 302 according to testing procedures defined by the test scripts 1202. During testing, the project testing component 212 can monitor test results 1206 or responses of the system project 302 to the test interactions defined by the test scripts 1202 and determine whether these test results 1206 match expected results defined by the test scripts 1202. In this way, proper operation of the system project 302 can be verified prior to deployment.

In some test scenarios, test scripts 1202 can define testing sequences that are applied to the system project 302 as a whole in a holistic manner rather than to a specific control program or routine. For example, the project testing component 212 can execute test scripts 1202 that verify linkages or relationships across design platforms—e.g., control code, visualization applications, electrical drawings, panel layout definitions, wiring schedules, piping diagrams, etc.—that may otherwise not be tested.

If the test results 1206 indicate an improper operation of one or more aspects of system project 302, project testing component 212 may generate and render one or more design recommendations 1208 indicating possible modifications to the system project 302 that would correct operation of the project. These design recommendations 1208 may include, for example, control code modifications or replacements, recommended corrections of data tag addresses, recommended corrections to HMI graphical object references, recommended corrections to mechanical or electrical drawings for consistency with the control code (e.g., to add a missing output device to an electrical drawing corresponding to an output device referenced by the control programming), recommended modifications to an industrial device's configuration parameters, or other such corrections.

Figure 13:
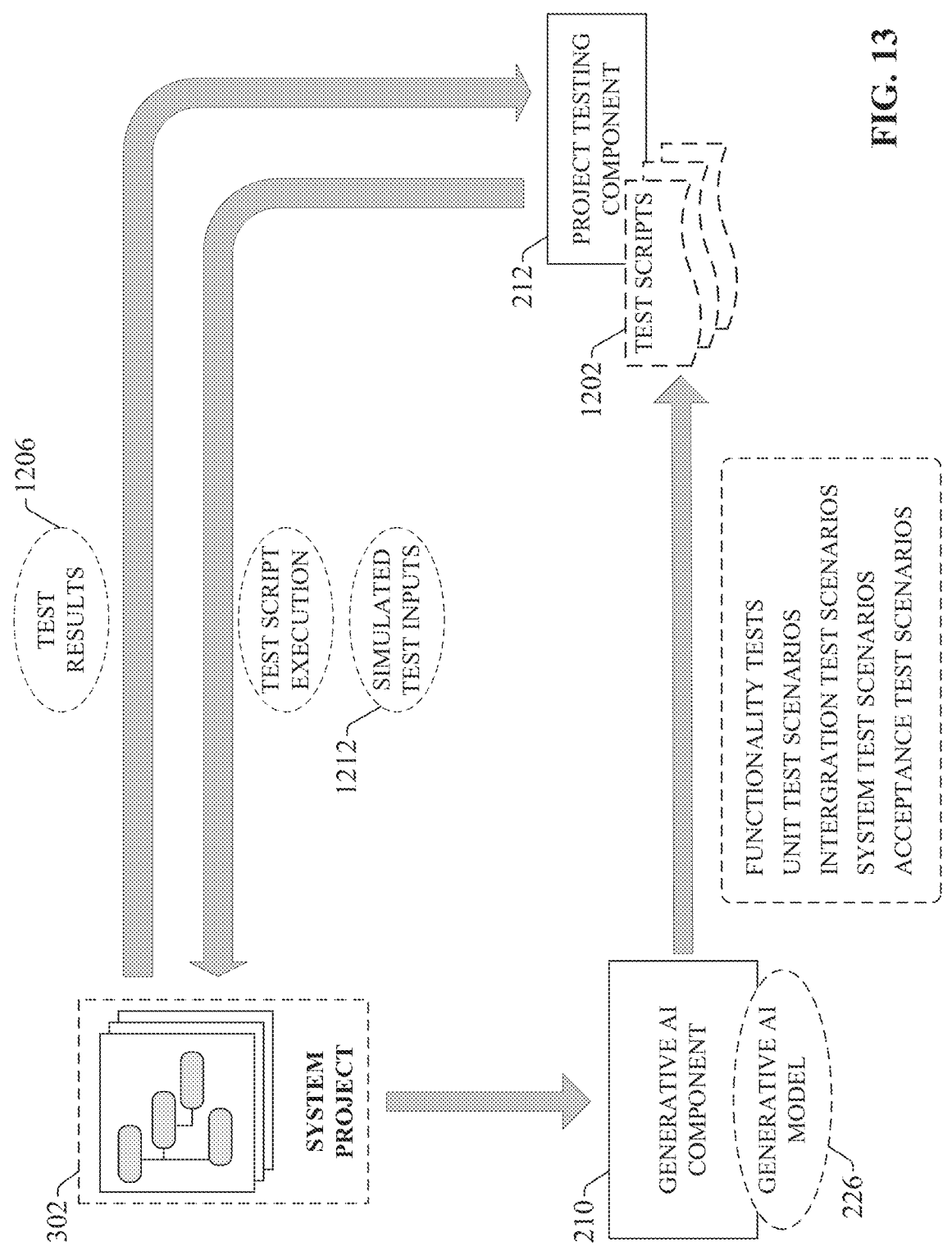
FIG. 13 is a diagram illustrating generation of test scripts by the industrial IDE system using generative AI.

To mitigate the need for a system developer to create custom test scripts 1202 to validate operation of a system project 302 prior to deployment, some embodiments of the generative AI component 210 can be configured to use the generative AI model 226 to automatically generate suitable test scripts 1202 designed to test and validate portions of the system project 302. FIG. 13 is a diagram illustrating generation of test scripts 1202 by the industrial IDE system 202 using generative AI according to one or more embodiments. The generative AI component 210 can analyze a system project 302 using the trained model 226 to infer suitable test scenarios for validating the project 302. The determination of suitable test scenarios for a given system project 302 can be based on the model's training on pre-learned industrial experience relating to different types of industrial applications, assets, processes, and safety standards. For each test scenario devised by the generative AI model 226 for the system project 302 under analysis, the generative AI component 210 generates one or more associated test scripts 1202, and may also define particular ways to apply the test script 1202 (e.g., specifying which routines of the system project's control code 908 to validate using one of the test scripts 1202, which other project elements should be cross-referenced for validation purposes using the test scripts 1202, etc.).

In an example scenario, the generative AI component 210 may infer, based on generative AI analysis of the project 302 using the model 226, an industrial vertical to which the system project 302 relates (e.g., automotive, oil and gas, food and drug, etc.), and generate contextual test scripts 1202 based on the identified vertical. In this regard, the generative AI model 226 may be trained with knowledge that certain industrial verticals mandate particular testing methodologies in connection with validating industrial control programming or other aspects of a system project, and these testing methodologies can be implemented by contextual test scripts 1202 generated by the generative AI component 210 as a function of the identified vertical. The generative AI component 210 can also identify specific types of control operations or industrial applications that respective sections of control code 908 have been designed to carry out, and can formulate test scenarios and corresponding test scripts 1202 for verifying correct operation of those portions of the code 908, based on the model's training on validation measures for those types of control operations or industrial applications.

In various embodiments, the generative AI model 226 can, based on analysis of the system project 302 and inferences of the types of validation tests that should be performed on the project 302 prior to deployment, generate test scripts 1202 for validating that portions of control code 908 will correctly perform functions that those portions were designed to carry out. The model 226 can also identify any instances of smart objects 422 or grouping of interconnected smart objects 422 that are included as part of the control code 908 and generate test scripts 1202 for executing functional validation tests on these smart object instances. Other types of test scenarios for which the generative AI component 210 can generate test scripts 1202 can include, but are not limited to, scenarios designed to test units or devices determined to be part of the automation system to be controlled by the project 302, integration test scenarios, system test scenarios, factory acceptance test scenarios, or other types of tests. The generative AI component 210 can also leverage the model's training on industrial safety standards to generate safety test scenarios for validating the project's compliance with any prevailing industrial safety standards, and generate test scripts 1202 for testing these scenarios.

During testing of the system project 302, the project testing component 212 can execute the one or more test scripts 1202 in accordance with each test scenario defined by the generative AI component 210 in sequence in order to comprehensively validate proper operation of the system project 302, in some cases across multiple platforms (control programming, visualization configuration, drawings, device configurations, etc.).

In some embodiments, generative AI component 210 can also generate a validation checklist based on analysis of the system project 302 and output this validation checklist via the user interface component 204. This validation checklist can provide instructions regarding on-site tests and checks that should be performed in connection with commissioning the automation system for which the system project 302 is being developed. These may comprise tests that should be performed on the automation system hardware and electrical connections that cannot be performed via testing of the system project 302 alone. Example validation checklists may include lists of I/O points whose connectivity should be verified, instructions to visually inspect panel-mounted equipment, sequences of manual operator panel interactions that should be performed to verify proper machine operation, or other such information.

Figure 14:
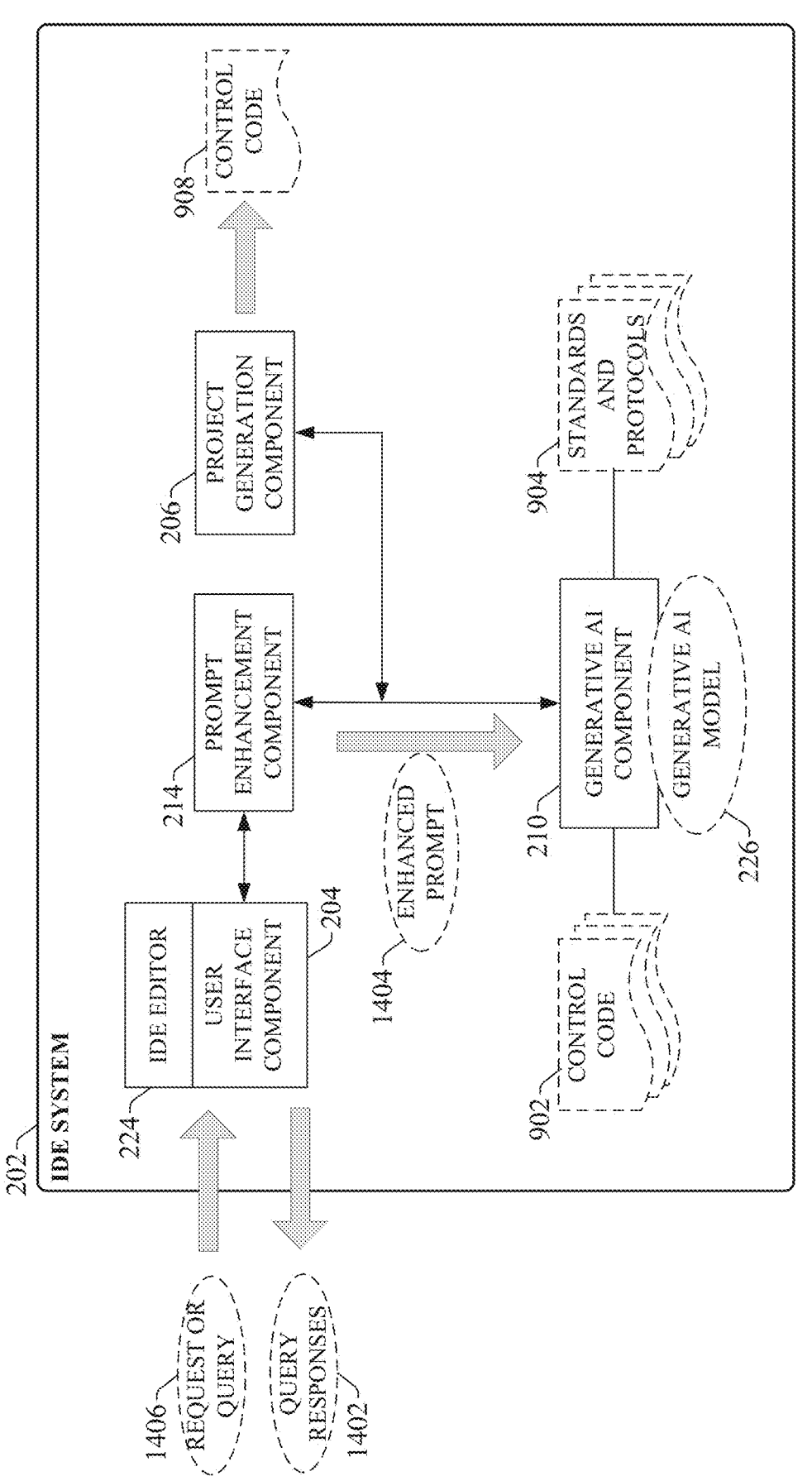
FIG. 14 is a diagram illustrating the use of prompt engineering in connection with generating control code or other aspects of a system project.

Embodiments of the industrial IDE system 202 can use prompt engineering services to quickly and accurately ascertain a developer's design needs and generate portions of a system project 302 to address those needs, or to provide more refined answers to design queries. FIG. 14 is a diagram illustrating the use of prompt engineering in connection with generating control code 908 or other aspects of a system project 302, as well as generating responses 1402 to design queries. The IDE system 202 an include a prompt enhancement component 214 configured to modify or enhance a user's design request or query 1406 (e.g., a question about specific control code 908) to yield an enhanced or refined prompt 1404 that assists the generative AI model 226 to better determine the user's needs relative to the original submitted query 1406.

In an example scenario, a user wishing to generate control code 908 for carrying out a specific control function, or who has a question about a submitted control program, can submit an initial plain language request or query that broadly states the functional requirement or query. The prompt enhancement component 214 can parse this initial request to determine the type of information or service being requested, and either refine and contextualize the initial query in a manner expected to assist the model 226 to more quickly and accurately arrive at the desired answer or design solution, or render one or more query responses 1402 that prompt the user for further information that will allow the model 226 to provide a more complete or accurate solution to the user's request, or that collaborate with the user in exploring potential content variations likely to satisfy the user's needs. This prompt engineering can be based in part on learned knowledge of the types of questions that need to be answered in order to generate control code 908 or other control system components that align with the requirements of an automation system for which the project is being designed.

The prompt enhancement component 214 can use a range of approaches for enhancing or modifying a plain language request submitted by the user before submitting the resulting enhanced prompt 1404 to the generative AI model 226.

According to an example approach, the prompt enhancement component 214 can access an archive of chat exchanges between the generative AI model 226 and other users and identify chat sessions that were initiated by user queries having similarities to the initial query 1406 submitted by the present user. Upon identifying these archived chat sessions, the prompt enhancement component 214 can analyze these past chat sessions to determine the types of information that were ultimate generated as a result of these sessions (e.g., control code 908 having features or elements that are a function of specific keywords of the user's query, a specific type of information about a system project 302 that was ultimately determined to be sought by the user, etc.), and generate the enhanced prompt 1404 to convey to the generative AI model 226 that these types of information should be part of the response 1402 to the query 1406.

Analysis of these archived chat sessions, as well as any other relevant industrial knowledge or expertise used to train the generative AI model 226, can also assist the prompt enhancement component 214 to infer the developer's needs from an initially vaguely worded request or query 1406, and to design the enhanced prompt 1404 to prompt the model 226 for the type of information determined to be of interest to the designer. This may include, for example, formulating the enhanced prompt 1404 to request, from the model 226, a specific type of information or generate a specifically formatted section of control code 908 that may not have been specified in the user's request or query 1406 but which the prompt enhancement component 214 ascertained to be the information or code that would address the user's needs. In this way, the prompt enhancement component 214 can actively frame a user's plain language request or query 1406 in a manner that quickly and accurately leads the generative AI model 226 to the user's desired results (e.g., generation of control code 908 or another portion of a system project 302 satisfying design constraints implied by the query 1406, the answer to a question about submitted control code 1102, etc.).

In another example approach, the prompt enhancement component 214 can enhance the user's query 1406 with additional information that contextualizes the user's request and integrate this additional information with the user's query 1406 to yield the enhanced prompt 1404. The types and sources of the additional contextual information can depend on the nature of the query 1406 and can include, but are not limited to, information obtained from vendor knowledgebases or device documentation for industrial devices known to be relevant to the user's query 1406 (or instructions to link to those sources of information in order to obtain necessary information for responding to the user's query 1406).

In another example, the prompt enhancement component 214 can infer the user's level of expertise based on the wording of the plain language request or query 1406 and frame the enhanced prompt 1404 or the query responses 1402 based on this inferred level of expertise. The user's level of expertise can be inferred, for example, based on a determination of whether the words used to formulate the original query 1406 are likely to be used by one of relatively advanced expertise who can be expected to understand more technically advanced responses 1402 or, alternatively, a layman who may require more fundamental information included in the responses 1402.

For users at these various levels of expertise, the prompt enhancement component 214 can word any query responses 1402 to the original query 1406—including responses 1402 prompting for additional information from the user to assist the generative AI model 226 in arriving at the user's desired result or responses 1402 that are believed to answer the user's queries—at the level deemed appropriate to the user's inferred level of presumed understanding. This can affect the choice of words used in the response 1402, as well as the granularity of the response's content.

Figure 15:
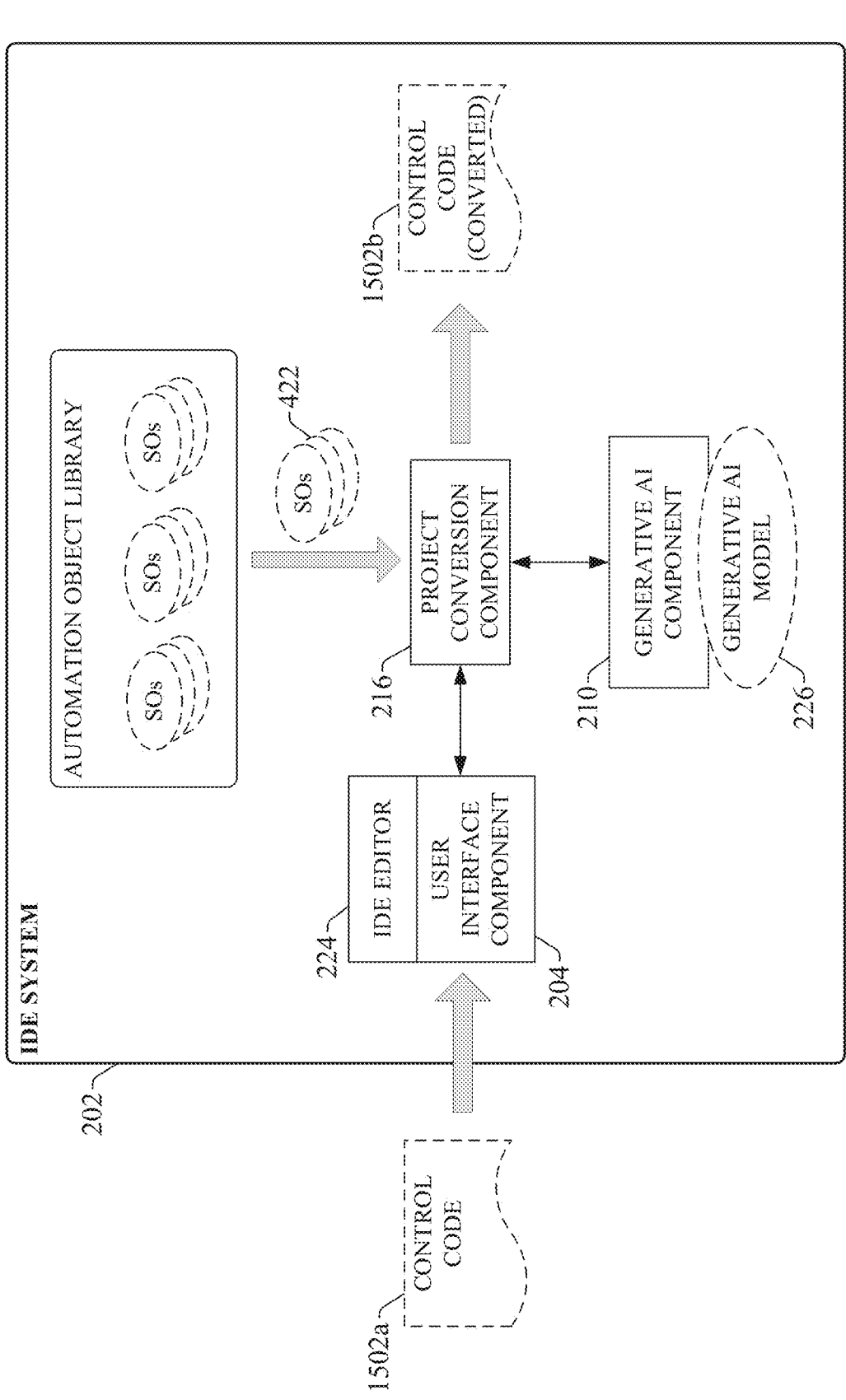
FIG. 15 is a diagram illustrating conversion of control code submitted to the IDE system to converted code using generative AI.

Some embodiments of the industrial IDE system 202 can also include project conversion tools that use the generative AI model 226 to perform various types of conversions or enhancements on submitted control code. FIG. 15 is a diagram illustrating conversion of control code 1502a submitted to the IDE system 202 to converted code 1502b using generative AI. In this example embodiment, users can submit control code 1502a to the IDE system 202 in a manner similar to submission of control code 1102 described above in connection with FIG. 11. In this case, the control code 1502a is submitted for conversion or enhancement by the system's project conversion component 216.

The project conversion component can perform various types of conversions on the control code 1502a. For example, the project conversion component 216 can leverage the generative AI component 210 (and model 226) to convert the functional format of the code 1502a from a first code format or language to a second code format or language, and generate converted control code 1502b that is functionally equivalent or similar to control code 1502a but formatted according to the second format. Example control code formats for the first or second formats can include, but are not limited to, ladder logic, structured text, functional block diagrams, industrial DSL, Python, C++, or other such formats.

The generative AI component 210 can assist with this conversion using the trained generative AI model 226. In an example scenario, a user can submit the original control code 1502a to the IDE system 202 and further submit, via interaction with the chat engine of the user interface component 204, a plain language request to convert the control code 1502a to a specified target format or programming language. The generative AI component 210 can use the generative AI model 226 to translate this request and to assist in creating new control code 1502b having the specified target format and having equivalent functionality to that of the submitted code 1502a.

This general approach can also be used to translate code 1502a designed to execute on a first vendor's hardware platform (e.g., an industrial controller 118 manufactured sold by the first vendor) into functionally equivalent code 1502b capable of execution on a second vendor's hardware platform. A similar conversion can be used to translate control code between different hardware platforms or device models offered by the same vendor, such that the project conversion component 216 converts code 1502a designed to execute on a first of the vendor's controller models to control code 1502b capable of execution on a second of the vendor's controller models. In some embodiments, the project conversion component 216 can also use the generative AI model 226 to translate control code 1502a having a first file format or type extension to converted control code 1502b of a different file format or type extension.

In some embodiments, if the submitted control code 1502a uses conventional data tags as holders for data generated by the code 1502a, the user may request that the system 202 generate converted code 1502b that replaces at least a subset of these data tags with corresponding smart objects 422 that either maintain or improve the functionality of the original tag-based code 1502a. As part of this conversion, the generative AI model 226 can also identify portions of the control code 1502*a* for which equivalent or corresponding smart objects 422 are available, and replace these code segments in the converted code 1502*b* with their corresponding smart objects 422. For example, the model 226 may identify a code segment of the submitted code 1502*a* designed to control a pump associated with a tank, and further identify that a smart object representing the pump and having, as an attribute, code for controlling the pump is available. Based on this recognition, the generative AI component 210 can instruct the project conversion component 216 to generate the converted control code 1502*b* such that the identified code segment is replaced with its corresponding pump smart object 422, which includes the necessary code for controlling the pump.

The generative AI model 226 can be trained with suitable style or mapping guides that allow the generative AI component 210 to assist with any of the foregoing code translation or conversions. In general, application of generative AI can streamline the process of control code conversion relative to direct line by line conversions by applying smarter guidance to the problem of converting control code between formats, languages, file types, or equipment.

Also, in some embodiments, the generative AI model 226 can be trained to examine submitted control code 1502*a* and generate plain language comments to be assigned to specific lines (e.g., ladder logic rungs) or sections of the code. These comments serve as human-readable descriptors that provide a functional summary or label for their corresponding lines or section of code. In such embodiments, this training can teach the model 226 to recognize lines or segments of code that are designed to carry out known control functions (e.g., feed conveyor control, detection of a specific alarm condition, a cycle start or cycle complete condition, etc.), and generate, for those lines or segments, plain language comments describing this functionality. To add specificity to the comments, the model 226 can generate one or more words of a given comment based on variable names or other content extracted from the line or segment of code itself. In this way, the model 226 can add, for example, customer-specific machine or device names to the comment so that the machine or device being controlled by the corresponding line or segment of code can be easily recognized by a user.

Some embodiments of the project conversion component 216 can also use the generative AI model 226 to localize content of submitted control code 1502*a* to a local standard, such that the converted code 1502*b* accords with local language, measurement standards, or other local practices. In an example workflow, a user may submit control code 1502*a* that is localized to a first region, such that the code 1502*a* comprises comprising human-readable words and comments adapted to the region's native language, that references a standard of measurement used by that region, or that employs coding or control standards specific to the region. The user can submit a request for a version of the code 1502*a* that is localized to a specified second region; e.g., by submitting a plain language request via the chat interface of the user interface component 204. In response, the project conversion component 216 can use the generative AI model 226—which can be trained with knowledge of the various languages, measurement standards, and industrial control and programming standards of various regions—to generate new control code 1502*b* that is functionally equivalent or similar to the submitted code 1502*a* but which accords with the language and standards of the specified region.

While the conversion examples discussed above have considered primarily control code 1502, any of the generative AI-based approaches for performing project conversions discussed above in connection with FIG. 15 can be performed on other components of a control system project 302. For example, in the case of localization, the IDE system 202 can use generative AI to localize a submitted HMI application 704 to the standards of a specified region. This may involve replacing human-readable text rendered on the HMI's display screens to the local language of the region, or modifying the arrangement of visualization objects or the navigation structures to accord with a local standard.

FIGS. 16*a*-21 illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

Figure 16A:
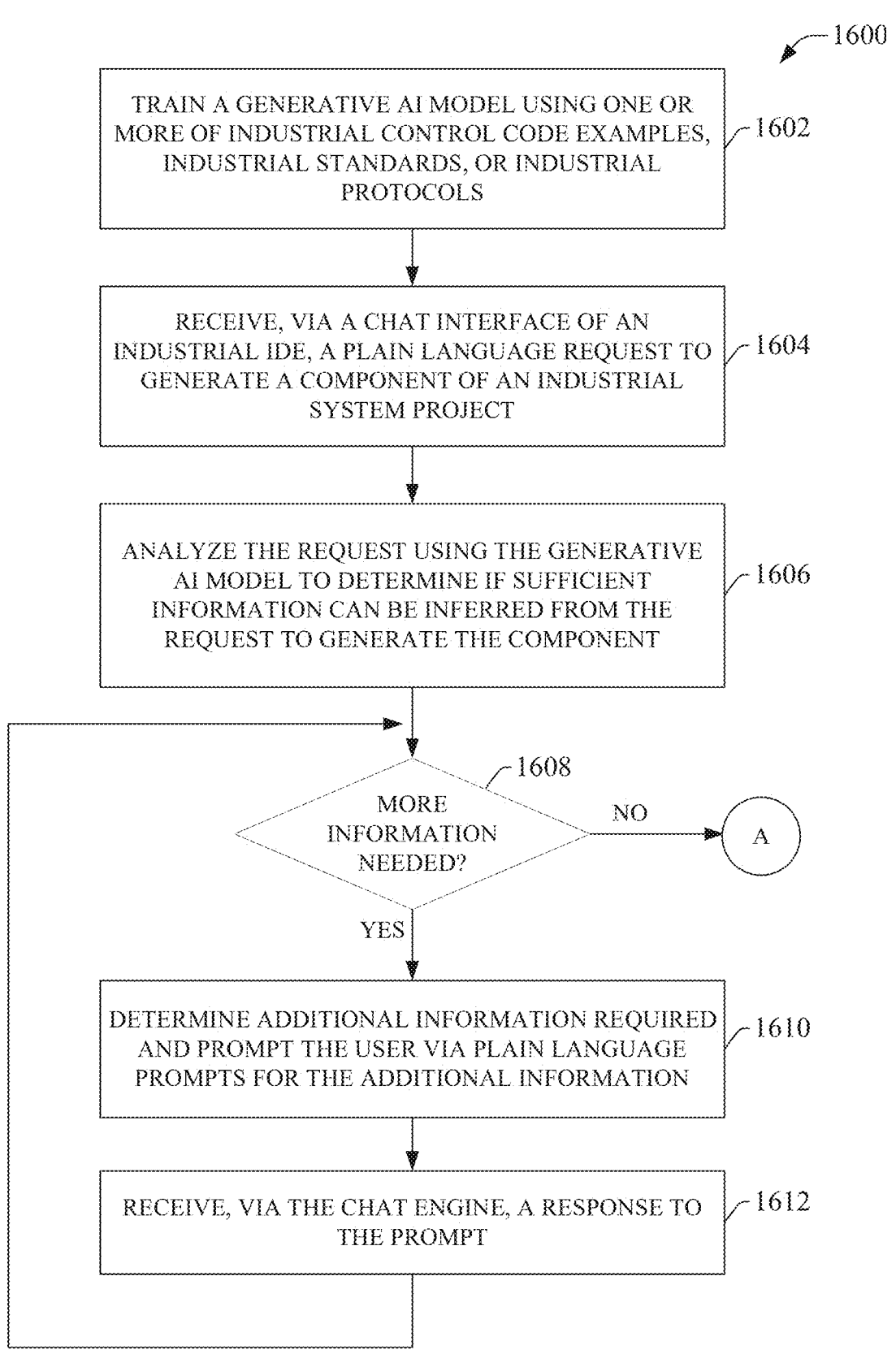
FIG. 16*a* is a flowchart of a first part of an example methodology for using generative AI to create portions of an industrial control project.
Figure 16B:
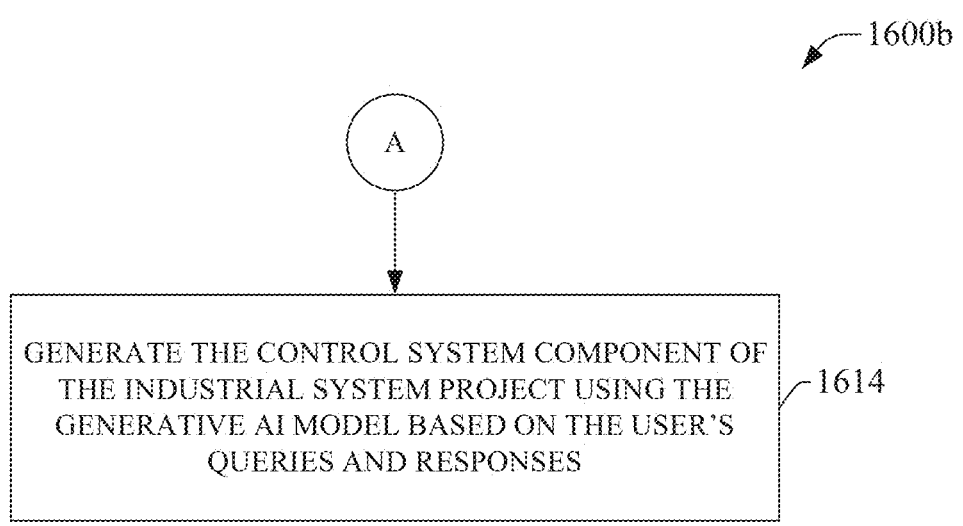
FIG. 16*b* is a flowchart of a second part of the example methodology for using generative AI to create portions of the industrial control project.

FIG. 16*a* illustrates a first part of an example methodology 1600*a* for using generative AI to create portions of an industrial control project, including industrial control programming. HMI applications, device configurations, or other such design aspects. Initially, at 1602, a generative AI model is trained using one or more of industrial control code examples, industrial standards (e.g., industrial safety standards, vertical-specific design standards, customer-specific in-house design standards, etc.), industrial protocols, or other such industrial-specific training data. At 1604, a plain language request to generate a component of an industrial system project is received via a chat interface of an industrial IDE system. The specified component may be, but is not limited to, control code for execution on an industrial controller that will be monitoring and controlling an automation system (e.g., ladder logic programming, structured text programming, an industrial DSL program, a function block diagram, etc.), an HMI application for visualizing data generated by the automation system, or other such design components. This initial request may be worded at any level of detail or granularity, and may specify such information as the type of industrial control application for which the component is required (e.g., conveyor control, web tension control, stamping press control, batch processing, etc.), a specific type of product or material to be produced by the automation system for which the component is being designed, the hardware platform on which the component will execute (e.g., a specific vendor or model of industrial controller or HMI terminal), the types and models of industrial devices and assets that make up the automation system for which the component is being designed, or other such information.

At 1606, the request is analyzed using the generative AI model trained at step 1602 to determine if sufficient information can be inferred from the request to determine the functional requirements of the requested component. At

1608, a determination is made as to whether more information is needed from the user in order to fulfil the request. If additional information is required (YES at step 1608), the methodology proceeds to step 1610, where the generative AI model is used to determine the additional information required, and to render a plain language prompt designed to guide the user toward providing the additional information. At 1612, a response to the prompt generated at step 1610 is received via the chat engine.

Steps 1608-1612 are repeated as a plain language dialog with the user until sufficient information translatable to a complete set of functional requirements for the requested system project component has been obtained. When no further information is required from the used (NO at step 1608), the methodology proceeds to the second part 1600b illustrated in FIG. 16b. At step 1614, the industrial IDE system generates the requested control system component using the generative AI model based on the user's initial query received at step 1604 and subsequent responses received at step 1612.

FIG. 17 illustrates an example methodology 1700 for using generative AI to troubleshoot or debug software components of an industrial control system project (e.g., control programming, HMI applications, etc.). Initially, at 1702, a generative AI model is trained using one or more of industrial control code examples, industrial standards, or industrial protocols (similar to step 1602 of methodology 1600a). At 1704, a plain language instruction to troubleshoot industrial control code is received via a chat interface of an industrial IDE system. At 1706, in response to this request, the control code is analyzed using the generative AI model trained at step 1702 to identify presence of control programming errors, deviations from industrial standards (including safety standards or vertical-specific standards such as food and drug standards), deviations from security protocols, coding or functional inefficiencies, or deviations from functional specifications that the control code was designed to carry out.

At 1708, a determination is made as to whether one or more issues were discovered by the analysis performed at step 1706. If an issue was discovered (YES at step 1708), the methodology proceeds to step 1710, where the industrial IDE system at least one of corrects the discovered issue or renders a plain language summary of the discovered issue and recommendations for modifying the control code to correct the issue. These corrections or recommendations can be generated based on the industry-specific training of the generative AI model.

FIG. 18 illustrates an example methodology 1800 for providing information about industrial control code using a trained generative AI model. Initially, at 1802, a generative AI model is trained using one or more of industrial control code examples, industrial standards, or industrial protocols (similar to step 1602 of methodology 1600a). At 1804, a plain language query regarding functionality of specified control code is received via a chat interface of an industrial IDE system. Substantially any type of question regarding the control code's functionality can be submitted in this manner, including questions about expected performance metrics that will be achieved by the control code (e.g., "What output rate will this code achieve?", "How much energy will this code consume?", etc.), questions about the code's compatibility with certain hardware platforms or firmware versions (e.g., "Will this code execute on a controller with firmware version 1.2.6?"), questions as to whether the code complies with a specified industrial standard, questions as to which part of the code corresponds to a specified control function, or other such queries.

At 1806, the control code is analyzed using the generative AI model trained at step 1802 to determine an answer to the query received at step 1804. At 1808, a plain language response to the query, answering the question regarding the functionality of the control code, is rendered via the chat interface.

FIG. 19 illustrates an example methodology 1900 for generating test scripts designed to validate proper operation of industrial control code. Initially, at 1902, a generative AI model is trained using one or more of industrial control code examples, industrial standards, or industrial protocols (similar to step 1602 of methodology 1600a). At 1904, a request is received via a chat interface of an industrial IDE system to generate test scripts for validating proper operation of industrial control code. In some embodiments, step 1904 may be omitted, and test scripts for the control code can be automatically generated by the remaining steps of methodology 1900 without a request from a user. Instead, generation of test scripts can be initiated by the IDE system as a step on the control code's development.

At 1906, in response to the request received at step 1904, the industrial IDE system formulates, based on analysis of the control code using the generative AI model trained at step 1902, test scenarios to be executed against respective portions of the control code in order to validate the code. At 1908, the IDE system can generate, using the trained generative AI model, test scripts for executing the test scenarios on the control code. A given test script can define a testing routine in terms of a sequencing of simulated inputs to be fed to a portion of the control code, and expected responses of the code to the simulated inputs. In some embodiments, the testing routines defined by the test scripts can be based in part on the programmatic context of the target control code portion being tested (e.g., the type of automation application for which the control code is designed, an industrial vertical within which the control code is to be used, an industrial function being carried out by the control code, etc.).

At 1910, the test scripts are executed to validate proper operation of the control code. At 1912, a determination is made as to whether the project is validated based on the response to of the system project to execution of the test scripts. If the project is validated (YES at step 1308), the methodology ends. Alternatively, if the project is not validated (NO at step 1912), the methodology proceeds to step 1914, where a recommendation for modifying the control code in a manner that will satisfy the test script is generated and rendered. This recommendation may comprise, for example, a recommended control code modification or replacement, recommended corrections to data tag addresses, recommended modifications of an industrial device's configuration parameters, or other such corrections. In addition or as an alternative to generating a recommendations, the corrections may be automatically implemented in the control code at step 1914.

FIG. 20 illustrates an example methodology 2000 for using generative AI to create program comments and documentation for industrial control code. Initially, at 2002, a generative AI model is trained using one or more of industrial control code examples, industrial standards, or industrial protocols (similar to step 1602 of methodology 1600a). At 2004, industrial control code is analyzed using the generative AI model trained at step 2002 to identify or infer functionalities of segments or lines of the control code. At 2006, human-readable comments describing the identified functionalities are generated using the trained generative AI model. At 2008, the human-readable comments generated at step 2006 are assigned to their respective segments of the control code to yield commented control code.

FIG. 21 illustrates an example methodology 2100 for using generative AI to perform various types of conversions on submitted industrial control code. Initially, at 2102, a generative AI model is trained using one or more of industrial control code examples, industrial standards, or industrial protocols (similar to step 1602 of methodology 1600a). At 2104, a plain language request to convert a first version of control code to a second version of control code is received via a chat interface of an industrial IDE system. This request can specify a conversion of at least one of a language of the control code (e.g., to localize the comments and labels used in the code to a local language), a hardware compatibility of the control code (e.g., by converting the file format of the code from a format executable on a first industrial controller model to a second industrial controller model), or a functional code type of the control code (e.g., translating between any two of ladder logic, functional block diagrams, sequential function chats, structured text, industrial DSL, or other industrial programming formats). At 2106, the second version of the control code is generated in accordance with the request received at step 2104 using the generative AI model that was trained at step 2102.

Embodiments, systems, and components described herein, as well as control systems and automation environments in which various aspects set forth in the subject specification can be carried out, can include computer or network components such as servers, clients, programmable logic controllers (PLCs), automation controllers, communications modules, mobile computers, on-board computers for mobile vehicles, wireless components, control components and so forth which are capable of interacting across a network. Computers and servers include one or more processors-electronic integrated circuits that perform logic operations employing electric signals-configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including Device-Net, ControlNet, safety networks, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software compo-nents). These include components such as switches with virtual local area network (VLAN) capability. LANs, WANs, proxies, gateways, routers, firewalls, virtual private network (VPN) devices, servers, clients, computers, con-figuration tools, monitoring tools, and/or other devices.

Figure 22:
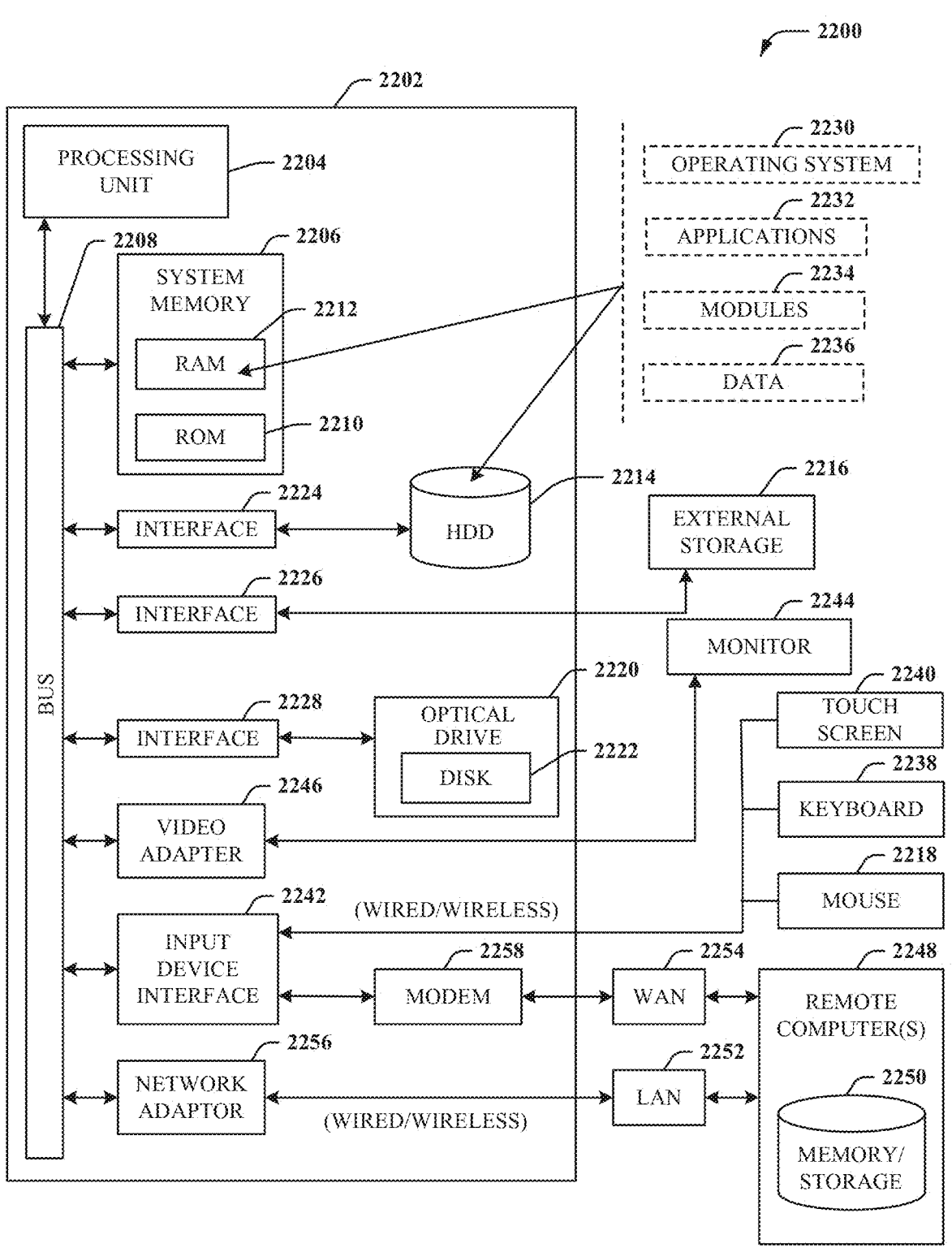
FIG. 22 is an example computing environment.
Figure 23:
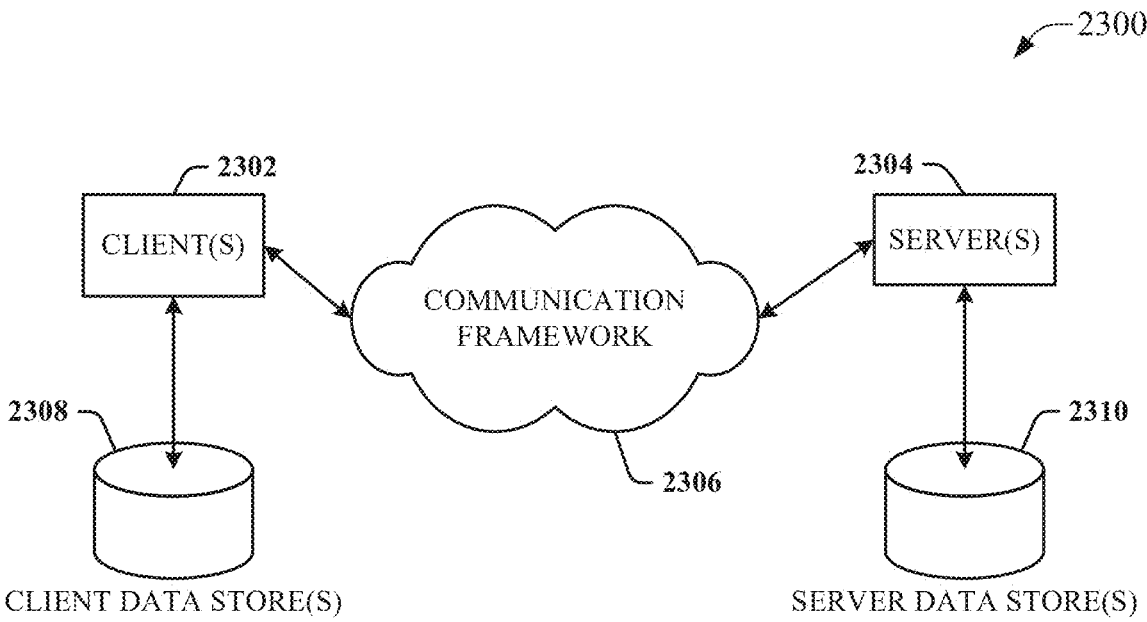
FIG. 23 is an example networking environment.

In order to provide a context for the various aspects of the disclosed subject matter, FIGS. 22 and 23 as well as the following discussion are intended to provide a brief, general description of a suitable environment in which the various aspects of the disclosed subject matter may be implemented. While the embodiments have been described above in the general context of computer-executable instructions that can run on one or more computers, those skilled in the art will recognize that the embodiments can be also implemented in combination with other program modules and/or as a com-bination of hardware and software.

Generally, program modules include routines, programs, components, data structures, etc., that perform particular tasks or implement particular abstract data types. Moreover, those skilled in the art will appreciate that the inventive methods can be practiced with other computer system con-figurations, including single-processor or multiprocessor computer systems, minicomputers, mainframe computers, Internet of Things (IoT) devices, distributed computing systems, as well as personal computers, hand-held comput-ing devices, microprocessor-based or programmable con-sumer electronics, and the like, each of which can be operatively coupled to one or more associated devices.

The illustrated embodiments herein can be also practiced in distributed computing environments where certain tasks are performed by remote processing devices that are linked through a communications network. In a distributed com-puting environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available stor-age media that can be accessed by the computer and includes both volatile and nonvolatile media, removable and non-removable media. By way of example, and not limitation, computer-readable storage media or machine-readable stor-age media can be implemented in connection with any method or technology for storage of information such as computer-readable or machine-readable instructions, pro-gram modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tan-gible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 22, the example environment 2200 for implementing various embodiments of the aspects described herein includes a computer 2202, the computer 2202 including a processing unit 2204, a system memory 2206 and a system bus 2208. The system bus 2208 couples system components including, but not limited to, the system memory 2206 to the processing unit 2204. The processing unit 2204 can be any of various commercially available processors. Dual microprocessors and other multi-processor architectures can also be employed as the processing unit 2204.

The system bus 2208 can be any of several types of bus structure that can further interconnect to a memory bus (with or without a memory controller), a peripheral bus, and a local bus using any of a variety of commercially available bus architectures. The system memory 2206 includes ROM 2210 and RAM 2212. A basic input/output system (BIOS) can be stored in a non-volatile memory such as ROM, erasable programmable read only memory (EPROM), EEPROM, which BIOS contains the basic routines that help to transfer information between elements within the computer 2202, such as during startup. The RAM 2212 can also include a high-speed RAM such as static RAM for caching data.

The computer 2202 further includes an internal hard disk drive (HDD) 2214 (e.g., EIDE, SATA), one or more external storage devices 2216 (e.g., a magnetic floppy disk drive (FDD) 2216, a memory stick or flash drive reader, a memory card reader, etc.) and an optical disk drive 2220 (e.g., which can read or write from a CD-ROM disc, a DVD, a BD, etc.). While the internal HDD 2214 is illustrated as located within the computer 2202, the internal HDD 2214 can also be configured for external use in a suitable chassis (not shown). Additionally, while not shown in environment 2200, a solid state drive (SSD) could be used in addition to, or in place of, an HDD 2214. The HDD 2214, external storage device(s) 2216 and optical disk drive 2220 can be connected to the system bus 2208 by an HDD interface 2224, an external storage interface 2226 and an optical drive interface 2228, respectively. The interface 2224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 2202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 2212, including an operating system 2230, one or more application programs 2232, other program modules 2234 and program data 2236. All or portions of the operating system, applications, modules, and/or data can also be cached in the RAM 2212. The systems and methods described herein can be implemented utilizing various commercially available operating systems or combinations of operating systems.

Computer 2202 can optionally comprise emulation technologies. For example, a hypervisor (not shown) or other intermediary can emulate a hardware environment for operating system 2230, and the emulated hardware can optionally be different from the hardware illustrated in FIG. 22. In such an embodiment, operating system 2230 can comprise one virtual machine (VM) of multiple VMs hosted at computer 2202. Furthermore, operating system 2230 can provide runtime environments, such as the Java runtime environment or the .NET framework, for application programs 2232. Runtime environments are consistent execution environments that allow application programs 2232 to run on any operating system that includes the runtime environment. Similarly, operating system 2230 can support containers, and application programs 2232 can be in the form of containers, which are lightweight, standalone, executable packages of software that include, e.g., code, runtime, system tools, system libraries and settings for an application.

Further, computer 2202 can be enable with a security module, such as a trusted processing module (TPM). For instance with a TPM, boot components hash next in time boot components, and wait for a match of results to secured values, before loading a next boot component. This process can take place at any layer in the code execution stack of computer 2202, e.g., applied at the application execution level or at the operating system (OS) kernel level, thereby enabling security at any level of code execution.

A user can enter commands and information into the computer 2202 through one or more wired/wireless input devices, e.g., a keyboard 2238, a touch screen 2240, and a pointing device, such as a mouse 2218. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 2204 through an input device interface 2244 that can be coupled to the system bus 2208, but can be connected by other interfaces, such as a parallel port, an IEEE 1394 serial port, a game port, a USB port, an IR interface, a BLUETOOTH® interface, etc.

A monitor 2244 or other type of display device can be also connected to the system bus 2208 via an interface, such as a video adapter 2246. In addition to the monitor 2244, a computer typically includes other peripheral output devices (not shown), such as speakers, printers, etc.

The computer 2202 can operate in a networked environment using logical connections via wired and/or wireless communications to one or more remote computers, such as a remote computer(s) 2248. The remote computer(s) 2248 can be a workstation, a server computer, a router, a personal computer, portable computer, microprocessor-based entertainment appliance, a peer device or other common network node, and typically includes many or all of the elements described relative to the computer 2202, although, for purposes of brevity, only a memory/storage device 2250 is illustrated. The logical connections depicted include wired/ wireless connectivity to a local area network (LAN) 2252 and/or larger networks, e.g., a wide area network (WAN) 2254. Such LAN and WAN networking environments are commonplace in offices and companies, and facilitate enterprise-wide computer networks, such as intranets, all of which can connect to a global communications network, e.g., the Internet.

When used in a LAN networking environment, the computer 2202 can be connected to the local network 2252 through a wired and/or wireless communication network interface or adapter 2256. The adapter 2256 can facilitate wired or wireless communication to the LAN 2252, which can also include a wireless access point (AP) disposed thereon for communicating with the adapter 2256 in a wireless mode.

When used in a WAN networking environment, the computer 2202 can include a modem 2258 or can be connected to a communications server on the WAN 2254 via other means for establishing communications over the WAN 2254, such as by way of the Internet. The modem 2258, which can be internal or external and a wired or wireless device, can be connected to the system bus 2208 via the input device interface 2242. In a networked environment, program modules depicted relative to the computer 2202 or portions thereof, can be stored in the remote memory/ storage device 2250. It will be appreciated that the network connections shown are example and other means of establishing a communications link between the computers can be used.

When used in either a LAN or WAN networking environment, the computer 2202 can access cloud storage systems or other network-based storage systems in addition to, or in place of, external storage devices 2216 as described above. Generally, a connection between the computer 2202 and a cloud storage system can be established over a LAN 2252 or WAN 2254 e.g., by the adapter 2256 or modem 2258, respectively. Upon connecting the computer 2202 to an associated cloud storage system, the external storage interface 2226 can, with the aid of the adapter 2256 and/or modem 2258, manage storage provided by the cloud storage system as it would other types of external storage. For instance, the external storage interface 2226 can be configured to provide access to cloud storage sources as if those sources were physically connected to the computer 2202.

The computer 2202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

FIG. 23 is a schematic block diagram of a sample computing environment 2300 with which the disclosed subject matter can interact. The sample computing environment 2300 includes one or more client(s) 2302. The client(s) 2302 can be hardware and/or software (e.g., threads, processes, computing devices). The sample computing environment 2300 also includes one or more server(s) 2304. The server(s) 2304 can also be hardware and/or software (e.g., threads, processes, computing devices). The servers 2304 can house threads to perform transformations by employing one or more embodiments as described herein, for example. One possible communication between a client 2302 and servers 2304 can be in the form of a data packet adapted to be transmitted between two or more computer processes. The sample computing environment 2300 includes a communication framework 2306 that can be employed to facilitate communications between the client(s) 2302 and the server(s) 2304. The client(s) 2302 are operably connected to one or more client data store(s) 2308 that can be employed to store information local to the client(s) 2302. Similarly, the server (s) 2304 are operably connected to one or more server data store(s) 2310 that can be employed to store information local to the servers 2304.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system, comprising:
a memory that stores executable components and a generative artificial intelligence (AI) model that has been trained using training data comprising at least one of industrial control code samples, industrial standards data, or industrial protocol data; and
a processor, operatively coupled to the memory, that executes the executable components, the executable components comprising:
  a user interface component configured to render a chat interface configured to receive industrial design input data as plain language input data;
  a generative AI component configured to
    infer functional requirements of a control system for an industrial automation system based on generative AI analysis of the industrial design input data using the generative AI model, and
    determine, based on the generative AI analysis, at least one of a type of industrial control application implemented by the industrial automation system or an industrial vertical of the industrial automation system; and
  a project generation component configured to generate, based on the generative AI analysis, industrial control code designed to satisfy the functional requirements,
  wherein
    the generative AI component generates the industrial control code to conform to one or more industrial safety standards or control programming standards determined to be applicable to the type of industrial control application or the industrial vertical, and
    the generative AI component is further configured to render, via the chat interface, a plain language prompt for additional information required to infer the functional requirements.

2. The system of claim 1, wherein the generative AI component is configured to render the plain language prompt for the additional information in response to determining that the plain language input data contains insufficient information for inferring sufficient functional requirements translatable to the industrial control code.

3. The system of claim 2, wherein the generative AI component is further configured to determine the additional information required to infer the functional requirements based on the generative AI analysis of the industrial design input, and to generate the plain language prompt requesting the additional information.

4. The system of claim 1, wherein
the generative AI component is configured to identify an industrial code sample from among the industrial control code samples satisfying one or more of the functional requirements, and
the project generation component is configured to generate the industrial control code to include the industrial control code sample or a variation of the industrial control code sample.

5. The system of claim 1, wherein
the generative AI component is further configured to generate, based on further generative AI analysis of the industrial design input data using the generative AI model, a design for a human-machine interface (HMI) configured to visualize runtime information for an industrial automation system to be monitored and controlled by the industrial control code, and
the project generation component is configured to generate an HMI application that implements the design.

6. The system of claim 1, wherein
the generative AI model is further trained to understand an industrial domain-specific language (DSL), and
the generative AI component is configured to generate the industrial control code formatted as the industrial DSL.

7. The system of claim 1, wherein
the chat interface is configured to receive, as part of the industrial design input data, a plain language request for recommended device configuration settings, to be applied to a specified industrial device, suitable for a specified type of industrial control application,
the generative AI component is configured to infer, based on generative AI analysis of the plain language request using the generative AI model, device configuration settings determined to be suitable for configuring the specified industrial device to carry out the specified type of industrial control application, and
the user interface component is configured to render the device configuration settings.

8. The system of claim 1, wherein
the generative AI component is further configured to generate, based on application of generative AI analysis to at least one of the industrial control code or the plain language input data, recommendations of industrial devices and corresponding device settings for the industrial devices suitable for implementing the control system or the industrial automation system, and
the user interface component is configured to render the recommendations.

9. The system of claim 1, wherein the plain language input data specifies at least one of the type of industrial control application for which the industrial control code is required, a vendor or model of an industrial controller on which the industrial control code will be executed, an identity of a machine of the automation system to be monitored and controlled by the control system using the industrial control code, an indication of a performance metric of the automation system to be achieved by the industrial control code, an indication of a type of product or material to be manufactured by the automation system, or a programming language in which the industrial control code is to be formatted.

10. A method, comprising:
training, by an industrial integrated development environment (IDE) system comprising a processor, a generative artificial intelligence (AI) model using training data comprising at least one of industrial control code samples, industrial standards data, or industrial protocol data;
receiving, via a chat interface of the industrial IDE system, industrial design input data formatted as a plain language input;
inferring, by the industrial IDE system, functional requirements of a control system for an industrial automation system based on generative artificial AI analysis of the industrial design input data using the generative AI model, wherein the inferring comprises:
  rendering, via the chat interface, a plain language prompt for additional information required to infer the functional requirements, and inferring the functional requirements based on the additional information received via the chat interface;

determining, by the industrial IDE system based on the generative AI analysis, at least one of a type of industrial control application implemented by the industrial automation system or an industrial vertical of the industrial automation system; and generating, by the industrial IDE system, industrial control code designed to satisfy the functional requirements, wherein the generating comprises generating the industrial control code to conform to one or more industrial safety standards or control programming standards determined to be applicable to the type of industrial control application or the industrial vertical.

11. The method of claim 10, wherein the rendering of the plain language prompt comprises rendering the plain language prompt in response to determining that the plain language input contains insufficient information for inferring sufficient functional requirements translatable to the industrial control code.

12. The method of claim 11, further comprising, wherein the rendering of the plain language prompt comprises:

determining, by the industrial IDE system, the additional information required to infer the functional requirements based on generative AI analysis of the plain language input data, and rendering the plain language prompt requesting the additional information.

13. The method of claim 10, wherein the generating comprises:

identifying an industrial code sample from among the industrial control code samples satisfying one or more of the functional requirements; and generating the industrial control code to include the industrial control code sample or a variation of the industrial control code sample.

14. The method of claim 10, further comprising:

generating, by the industrial IDE system based on further generative AI analysis of the industrial design input data using the generative AI model, a design for a human-machine interface (HMI) configured to visualize runtime information for an industrial automation system to be monitored and controlled by the industrial control code; and generating an HMI application that implements the design.

15. The method of claim 10, wherein the generative AI model is further trained to understand an industrial domain-specific language (DSL), and the generating comprises generating the industrial control code formatted as the industrial DSL.

16. The method of claim 10, wherein the chat interface is configured to receive, as part of the industrial design input data, a plain language request for recommended device configuration settings, to be applied to a specified industrial device, that are suitable for a specified type of industrial control application, the method further comprises:

inferring, by the industrial IDE system based on generative AI analysis of the plain language request using the generative AI model, device configuration settings determined to be suitable for configuring the specified industrial device to carry out the specified type of industrial control application, and rendering, by the industrial IDE system the device configuration settings.

17. The method of claim 10, further comprising:

generating, by the industrial IDE system based on application of generative AI analysis to at least one of the industrial control code or the plain language input data, recommendations of industrial devices and corresponding device settings for the industrial devices suitable for implementing the industrial control system or the industrial automation system, and rendering, by the industrial IDE system, the recommendations.

18. The method of claim 10, wherein the plain language input data specifies at least one of the type of industrial control application for which the industrial control code is required, a vendor or model of an industrial controller on which the industrial control code will be executed, an identity of a machine of the automation system to be monitored and controlled by the control system using the industrial control code, an indication of a performance metric of the automation system to be achieved by the industrial control code, an indication of a type of product or material to be manufactured by the automation system, or a programming language in which the industrial control code is to be formatted.

19. A non-transitory computer-readable medium having stored thereon instructions that, in response to execution, cause an industrial integrated development environment (IDE) system comprising a processor to perform operations, the operations comprising:

receiving industrial design input data formatted as a plain language input;

inferring functional requirements of a control system for an industrial automation system based on generative artificial intelligence (AI) analysis of the industrial design input data using a generative AI model, wherein the generative AI model is trained using training data comprising at least one of industrial control code samples, industrial standards data, or industrial protocol data, and the inferring comprises:

rendering a plain language prompt for additional information required to infer the functional requirements, and inferring the functional requirements based on the additional information received in response to the plain language prompt;

determining, based on the generative AI analysis, at least one of a type of industrial control application implemented by the industrial automation system or an industrial vertical of the industrial automation system; and generating industrial control code designed to satisfy the functional requirements, wherein the generating comprises generating the industrial control code to conform to one or more industrial safety standards or control programming standards determined to be applicable to the type of industrial control application or the industrial vertical.

20. The non-transitory computer-readable medium of claim 19, wherein the plain language input data specifies at least one of the type of industrial control application for which the industrial control code is required, a vendor or model of an industrial controller on which the industrial control code will be executed, an identity of a machine of the automation system to be monitored and controlled by the control system using the industrial control code, an indication of a performance metric of the automation system to be achieved by the industrial control code, an indication of a type of product or material to be manufactured by the automation system, or a programming language in which the industrial control code is to be formatted.

\* \* \* \* \*